(12) United States Patent
Jung et al.

(10) Patent No.: US 12,455,652 B2
(45) Date of Patent: Oct. 28, 2025

(54) DISPLAY DEVICE

(71) Applicant: Samsung Display Co., Ltd., Yongin-si (KR)

(72) Inventors: Keum Dong Jung, Yongin-si (KR); Sang Hun Park, Yongin-si (KR); Yong Sub So, Yongin-si (KR); Da Eun Yi, Yongin-si (KR); Bo Hwan Lee, Yongin-si (KR); Byeong Kyu Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 13 days.

(21) Appl. No.: 18/495,545

(22) Filed: Oct. 26, 2023

(65) Prior Publication Data

US 2024/0310949 A1    Sep. 19, 2024

(30) Foreign Application Priority Data

Mar. 16, 2023  (KR) .......................... 10-2023-0034703

(51) Int. Cl.
  *G06F 3/041* (2006.01)
  *G06F 3/044* (2006.01)

(52) U.S. Cl.
  CPC ........ *G06F 3/04166* (2019.05); *G06F 3/0412* (2013.01); *G06F 3/04164* (2019.05); *G06F 3/0418* (2013.01); *G06F 3/044* (2013.01); *G06F 3/0443* (2019.05); *G06F 3/0446* (2019.05)

(58) Field of Classification Search
  CPC ............ G06F 3/04166; G06F 3/04164; G06F 3/0418; G06F 3/044; G06F 3/0443; G06F 3/0446; G06F 3/0412
  See application file for complete search history.

(56) References Cited

U.S. PATENT DOCUMENTS

| 2021/0118349 A1* | 4/2021 | Choi | ..................... G06F 3/0446 |
| 2021/0397327 A1* | 12/2021 | Lee | ........................ G06F 3/0412 |

FOREIGN PATENT DOCUMENTS

| JP | 6320256 B2 | 5/2018 |
| KR | 10-1504883 B1 | 3/2015 |
| KR | 10-2372054 B1 | 3/2022 |
| KR | 10-2394332 B1 | 5/2022 |

* cited by examiner

*Primary Examiner* — Cory A Almeida
(74) *Attorney, Agent, or Firm* — Womble Bond Dickinson (US) LLP

(57) ABSTRACT

A display device includes: a touch sensing unit on a front surface of an image display area and configured to sense a location of a touch; a display driver circuit configured to select one of first to third temperature sensing modes during a predetermined temperature sensing period and to generate at least one of first to third mode sensing control signals according to the selected temperature sensing mode; and a touch driver circuit configured to generate at least one of first to third temperature sensing map data in response to at least one of the first to third mode sensing control signals, wherein the display driver circuit is configured to compensate for image data based on at least one of the first to third temperature sensing map data and to display an image according to the compensated image data in the display area.

20 Claims, 18 Drawing Sheets

DISPLAY DEVICE

CROSS REFERENCE TO RELATED APPLICATION

The present application claims priority to and the benefit of Korean Patent Application No. 10-2023-0034703, filed on Mar. 16, 2023, in the Korean Intellectual Property Office, the entire disclosure of which is incorporated herein by reference.

BACKGROUND

1. Field

Aspects of some embodiments of the present disclosure relate to a display device.

2. Description of the Related Art

As the information-oriented society evolves, various demands for display devices are ever increasing. For example, display devices are being utilized in a variety of electronic devices such as smart phones, digital cameras, laptop computers, navigation devices, and smart televisions.

Display devices may be flat panel display devices such as a liquid-crystal display device, a field emission display device, and an organic light-emitting display device. Among such flat panel display devices, a light-emitting display device includes a light-emitting element that can emit light on its own, so that each of the pixels of the display panel can emit light by themselves. Accordingly, a light-emitting display device can display images without a backlight unit that supplies light to the display panel.

Recently, a display device includes a touch detection module for sensing a user's touch as one of input interface mechanism. A touch sensing module includes a touch detecting unit in which touch electrodes are arranged, and a touch driver circuit that detects the amount of charge stored in the capacitance between the touch electrodes. The touch sensing module may be integrally formed on an image display portion of a display device or may be mounted on the front surface of the image display portion.

The above information disclosed in this Background section is only for enhancement of understanding of the background and therefore the information discussed in this Background section does not necessarily constitute prior art.

SUMMARY

Aspects of some embodiments of the present disclosure include a display device that can sense changes in temperature of a display panel either locally or globally by selectively using gate and data lines and touch electrodes arranged in the display panel.

Aspects of some embodiments of the present disclosure also include a display device that can compensate for image display quality based on the amount of changes in the temperature of a display panel and the regions where the temperature are changed that are sensed locally or globally.

It should be noted that characteristics of embodiments according to the present disclosure are not limited to the above-mentioned characteristics; and other characteristics of embodiments according to the present disclosure will be apparent to those skilled in the art from the following descriptions.

According to some embodiments of the present disclosure, a display device comprising a touch sensing unit on a front surface of an image display area and configured to sense a location of a user's touch, a display driver circuit configured to select one of first to third temperature sensing modes during a predetermined temperature sensing period and to generate at least one of first to third mode sensing control signals according to the selected temperature sensing mode, and a touch driver circuit configured to generate at least one of first to third temperature sensing map data in response to at least one of the first to third mode sensing control signals, wherein the display driver circuit compensates for image data based on at least one of the first to third temperature sensing map data and displays an image according to the compensated image data in the display area.

According to some embodiments, the display driver circuit selects the first temperature sensing mode so that the touch driver circuit generates the first temperature sensing map data using driving electrodes and sensing electrodes arranged perpendicular to one another other in the touch sensing unit and generates the first mode sensing control signal according to the selected first temperature sensing mode to transmit the generated first mode sensing control signal to the touch driver circuit.

According to some embodiments, the touch driver circuit provides a first sensing reference voltage having a predetermined voltage magnitude to the driving electrodes in response to the first mode sensing control signal and detects driving voltages fed back from the driving electrodes and sensing voltages detected through the sensing electrodes to sense a change in mutual capacitance of each of touch nodes where the driving electrodes and the sensing electrodes intersect each other.

According to some embodiments, the touch driver circuit sequentially converts the driving voltages fed back from the driving electrodes and the sensing voltages detected through the sensing electrodes into digital temperature data and generates the first temperature sensing map data by matching the sequentially converted digital temperature data with a touch node layout map of the image display area.

According to some embodiments, the display driver circuit selects the second temperature sensing mode so that the touch driver circuit generates the second temperature sensing map data using gate or data lines of the image display area and driving electrodes or sensing electrodes arranged in the touch sensing unit, generates the second mode sensing control signal according to the selected second temperature sensing mode to transmit it to the touch driver circuit.

According to some embodiments, the display driver circuit provides a second sensing reference voltage having a predetermined magnitude to the gate or data lines in response to the second mode sensing control signal, and wherein the touch driver circuit detects the sensing reference voltages fed back from the gate or data lines and the sensing voltages detected through the driving electrodes or the sensing electrodes to sense an amount of charge in a mutual capacitance of nodes where the gate or data lines and the driving electrodes or the sensing electrodes intersect each other.

According to some embodiments, the touch driver circuit sequentially converts the sensing reference voltages fed back from the gate or data lines and the sensing voltages detected through the driving electrodes or the sensing electrodes into digital temperature data and generates the second temperature sensing map data by matching the sequentially converted digital temperature data with an intersecting node layout map of the image display area.

According to some embodiments, the display driver circuit selects the third temperature sensing mode so that the touch driver circuit alternately generates the first and second temperature sensing map data at least every frame and generates the third temperature sensing map data according to an average of accumulated values of the first and second temperature sensing map data, and generates the third mode sensing control signal according to the selected third temperature sensing mode to transmit it to the touch driver circuit.

According to some embodiments, the touch driver circuit alternately generates the first and second mode sensing control signals at least every frame in response to the third mode sensing control signal, wherein the touch driver circuit generates the first mode sensing control signal by providing a first sensing reference voltage having a predetermined magnitude to the driving electrodes of the touch sensing unit, and detecting driving voltages fed back from the driving electrodes and sensing voltages detected through the sensing electrodes of the touch sensing unit to sense an amount of change in a mutual capacitance of each of the touch nodes where the driving electrodes and the sensing electrodes intersect each other, and wherein the touch driver circuit generates the second mode sensing control signal by providing a second sensing reference voltage having a predetermined magnitude to the gate or data lines of the image display area, and detecting the sensing reference voltages fed back from the gate or data lines and the sensing voltages detected through the driving electrodes or the sensing electrodes to sense an amount of change in the mutual capacitance of each of the nodes where the gate or data lines and the driving electrodes or the sensing electrodes intersect each other.

According to some embodiments, the touch driver circuit sequentially converts the driving voltages or the sensing reference voltages alternately fed back at least every frame and the sensing voltages detected through the driving electrodes or the sensing electrodes into digital temperature data, and alternately generates the first and second temperature sensing map data at least every frame by sequentially matching the sequentially converted digital temperature data with touch nodes or an intersecting node layout map of the image display area.

According to some embodiments, the touch driver circuit accumulates the first temperature sensing map data at least every frame to create first accumulated temperature sensing data with an average of the accumulated data, and accumulates the second temperature sensing map data at least every frame to create second accumulated temperature sensing data with an average of the accumulated data, and wherein the image display area is divided into a central area, an outer area and an edge area, and the first or second accumulated temperature sensing data is selectively matched with each of the central area, the outer area and the edge area to create the third temperature sensing map data that is accumulated temperature map data.

According to some embodiments of the present disclosure, a display device comprising a touch sensing unit on a front surface of an image display area and configured to sense a location of a user's touch, a display driver circuit configured to select a temperature sensing mode in a predetermined temperature sensing period and to generate a mode sensing control signal according to the selected temperature sensing mode, and a touch driver circuit configured to generate at least one temperature sensing map data in response to the mode sensing control signal, wherein the display driver circuit compensates for image data based on the at least one temperature sensing map data and displays an image according to the compensated image data in the display area.

According to some embodiments, the display driver circuit generates a first mode sensing control signal so that the touch driver circuit generates first temperature sensing map data using driving electrodes and sensing electrodes arranged in the touch sensing unit such that they are perpendicular to each other, and wherein the touch driver circuit provides a first sensing reference voltage having a predetermined magnitude to the driving electrodes and detects driving voltages fed back from the driving electrodes and sensing voltages detected through the sensing electrodes, and wherein the touch driver circuit sequentially converts the driving voltages fed back from the driving electrodes and the sensing voltages detected through the sensing electrodes into digital temperature data, and wherein the touch driver circuit matches the sequentially converted digital temperature data with a touch node layout map of the image display area to generate the first temperature sensing map data.

According to some embodiments, the display driver circuit generates a second mode sensing control signal so that the touch driver circuit generates second temperature sensing map data using gate or data lines of the image display area and driving electrodes or sensing electrodes arranged in the touch sensing unit, and provides a second sensing reference voltage having a predetermined voltage magnitude to the gate or data lines of the image display area.

According to some embodiments, the touch driver circuit detects the sensing reference voltages fed back from the gate or data lines and the sensing voltages detected through the driving electrodes or the sensing electrodes, sequentially converts the sensing reference voltages fed back from the gate or data lines and the sensing voltages detected through the driving electrodes or the sensing electrodes into digital temperature data, and generates the second temperature sensing map data by matching the sequentially converted digital temperature data with an intersecting node layout map of the image display area.

According to some embodiments, the display driver circuit selects a third temperature sensing mode and generates a third mode sensing control signal to transmit it to the touch driver circuit so that the touch driver circuit alternately generates first and second temperature sensing map data at least every frame and generates the third temperature sensing map data according to an average of accumulated values of the first and second temperature sensing map data, and generates the third mode sensing control signal according to the selected third temperature sensing mode to transmit it to the touch driver circuit.

According to some embodiments, the touch driver circuit alternately generates the first and second mode sensing control signals at least every frame in response to the third mode sensing control signal, wherein the touch driver circuit generates the first mode sensing control signal by providing a first sensing reference voltage having a predetermined magnitude to the driving electrodes, and detecting driving voltages fed back from the driving electrodes and sensing voltages detected through the sensing electrodes to sense an amount of change in a mutual capacitance of each of the touch nodes where the driving electrodes and the sensing electrodes intersect each other, and wherein the touch driver circuit generates the second mode sensing control signal by providing a second sensing reference voltage having a predetermined magnitude to the gate or data lines of the image display area, and detecting the sensing reference voltages fed back from the gate or data lines and the sensing voltages detected through the driving electrodes or the sensing electrodes to sense an amount of change in the mutual capacitance of each of the nodes where the gate or data lines and the driving electrodes or the sensing electrodes intersect each other.

According to some embodiments, the touch driver circuit sequentially converts the driving voltages or the sensing reference voltages alternately fed back at least every frame and the sensing voltages detected through the driving electrodes or the sensing electrodes into digital temperature data, and alternately generates the first and second temperature sensing map data at least every frame by sequentially matching the sequentially converted digital temperature data with touch nodes or an intersecting node layout map of the image display area.

According to some embodiments, the touch driver circuit accumulates the first temperature sensing map data at least every frame to create first accumulated temperature sensing data with an average of the accumulated data, and accumulates the second temperature sensing map data at least every frame to create second accumulated temperature sensing data with an average of the accumulated data, and wherein the image display area is divided into a central area, an outer area and an edge area, and the first or second accumulated temperature sensing data is selectively matched with each of the central area, the outer area and the edge area to create the third temperature sensing map data that is accumulated temperature map data.

According to some embodiments of the present disclosure, by sensing changes in temperature of a display panel of a display device by way of selectively using gate and data lines and touch electrodes of the display panel, it may be possible to efficiently sense the temperature of the display panel without any additional elements or structural changes. As a result, it may be possible to save the fabrication costs for sensing the temperature of the display panel.

In addition, by compensating for the image display quality based on the amount of changes in the temperature of the display panel and the regions where the temperature are changed, the display quality of images can be improved and customer satisfaction can be further improved.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects and features of embodiments according to the present disclosure will become more apparent by describing in more detail aspects of some embodiments thereof with reference to the attached drawings, in which:

FIG. 9 is a view showing an example of first temperature sensing map data generated in a first temperature sensing mode according to some embodiments of the present disclosure.

FIG. 11 is a view showing an example of second temperature sensing map data generated in a second temperature sensing mode according to some embodiments of the present disclosure.

DETAILED DESCRIPTION OF THE EMBODIMENTS

Aspects of some embodiments of the present disclosure will now be described more fully hereinafter with reference to the accompanying drawings, in which some embodiments of the present disclosure are shown. This disclosure may, however, be embodied in different forms and should not be construed as limited to the embodiments set forth herein. Rather, these embodiments are provided so that this disclosure will be thorough and complete, and will filly convey the scope of the disclosure to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

Each of the features of the various embodiments of the present disclosure may be combined or combined with each other, in part or in whole, and technically various interlocking and driving may be possible. Each embodiment may be implemented independently of each other or may be implemented together in an association.

Hereinafter, aspects of some embodiments of the present disclosure will be described in more detail with reference to the accompanying drawings.

Figure 1:
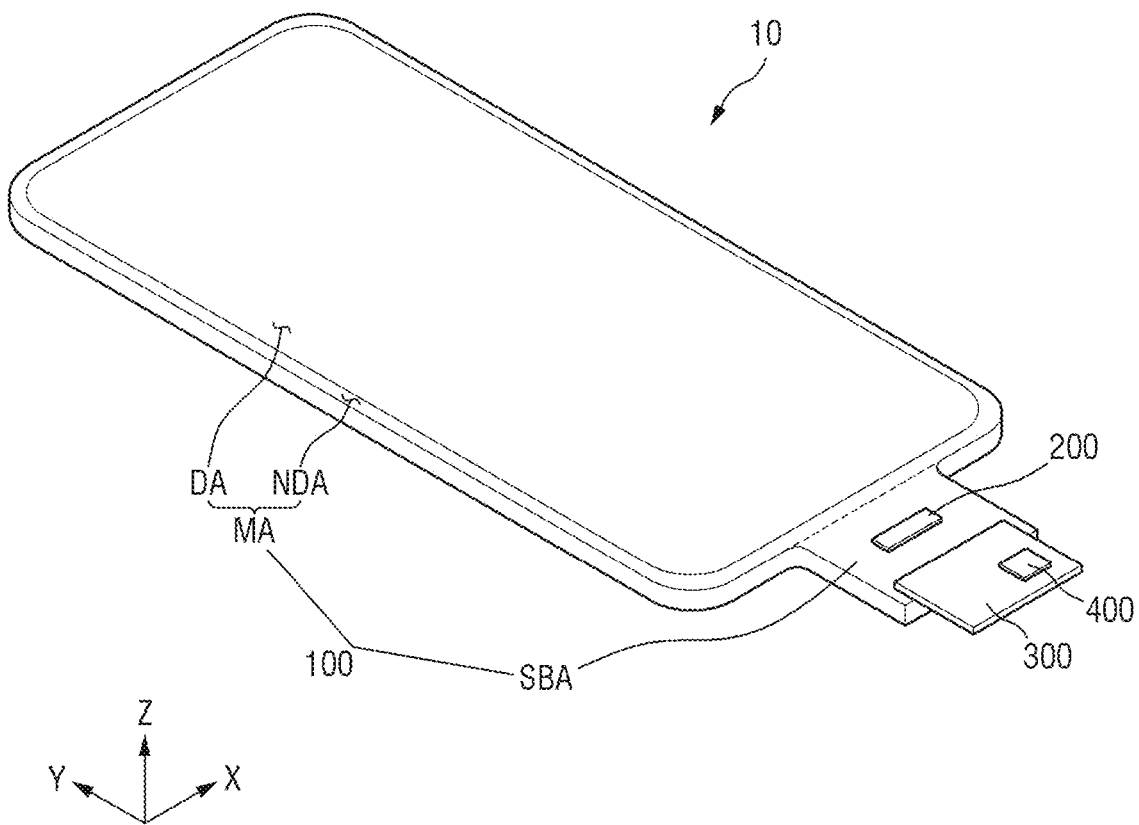
FIG. 1 is a perspective view of a display device according to some embodiments of the present disclosure.
Figure 2:
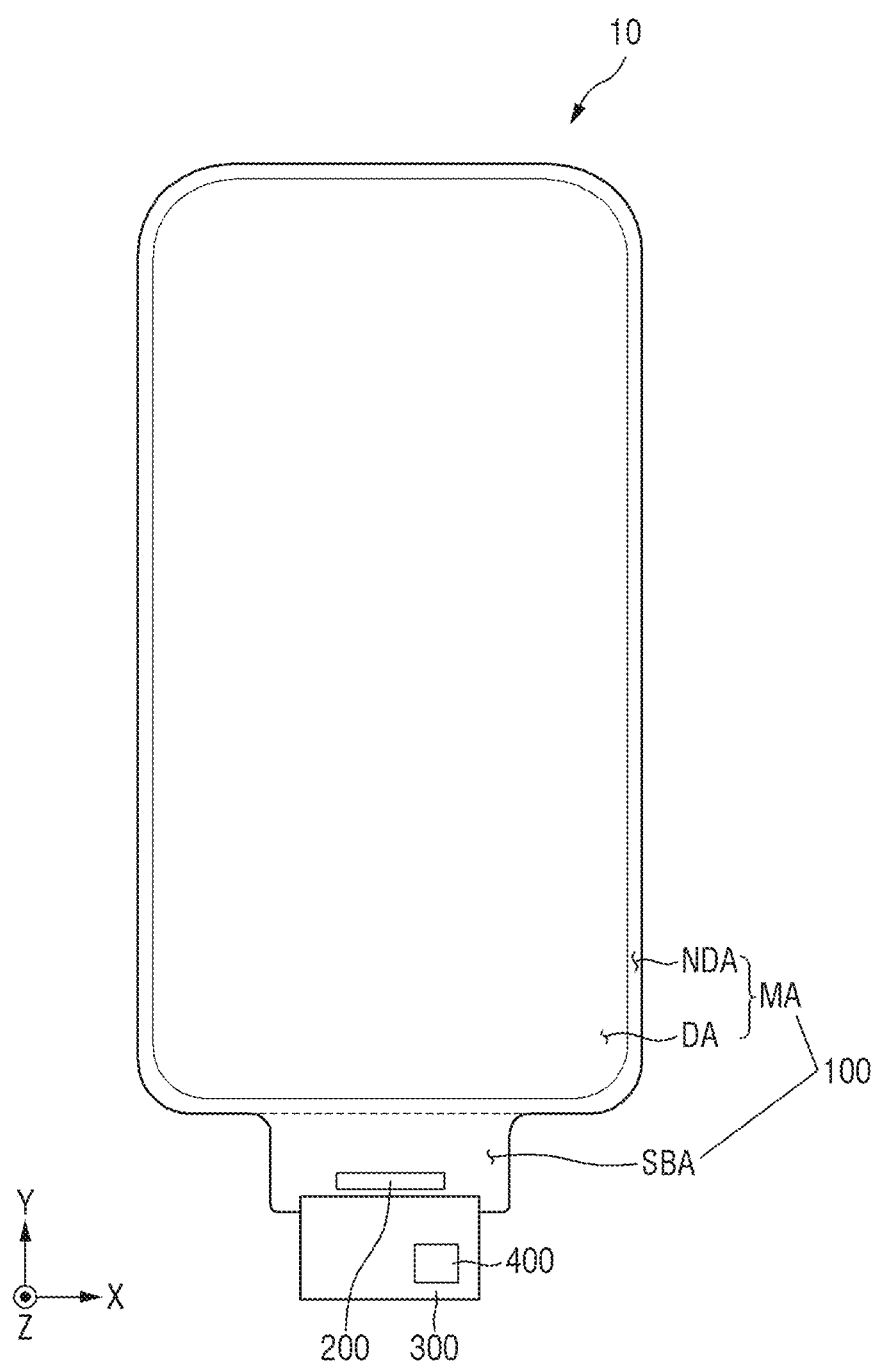
FIG. 2 is a plan view showing a display device according to some embodiments of the present disclosure.
Figure 3:
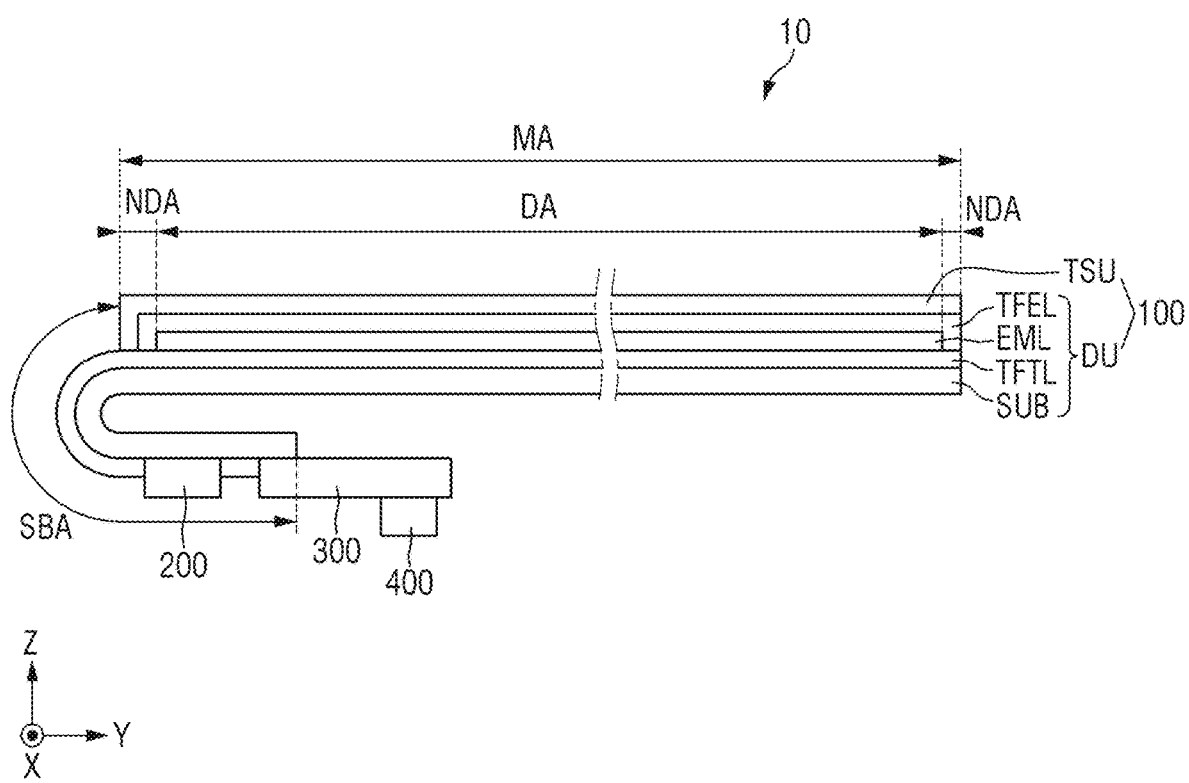
FIG. 3 is a view showing a side of the display device according to some embodiments of the present disclosure.

FIG. 1 is a perspective view of a display device according to some embodiments of the present disclosure. FIG. 2 is a plan view showing the display device according to some embodiments of the present disclosure. FIG. 3 is a view showing a side of the display device according to some embodiments of the present disclosure.

Referring to FIGS. 1 to 3, a display device 10 according to some embodiments of the present disclosure may be employed by (or incorporated within) portable electronic devices such as a mobile phone, a smart phone, a tablet PC, a mobile communications terminal, an electronic notebook, an electronic book, a portable multimedia player (PMP), a navigation device and an ultra mobile PC (UMPC).

In addition, the display device 10 according to some embodiments of the present disclosure may be used as a display unit of a television, a laptop computer, a monitor, an electronic billboard, or the Internet of Things (IoT). In addition, the display device 10 according to some embodiments of the present disclosure may be applied to wearable devices such as a smart watch, a watch phone, a glasses-type display, and a head-mounted display (HMD) device. Alternatively, the display device 10 according to some embodiments of the present disclosure may be used as a center information display (CID) at the instrument cluster, the center fascia or the dashboard of a vehicle, as a room mirror display on the behalf of the side mirrors of a vehicle, as a display placed on the back of each of the front seats that is an entertainment system for passengers at the rear seats of a vehicle.

According to some embodiments of the present disclosure, the display device 10 may be a light-emitting display device such as an organic light-emitting display device using organic light-emitting diodes, a quantum-dot light-emitting display device including quantum-dot light-emitting layer, an inorganic light-emitting display device including an inorganic semiconductor, and a micro-LED display device using micro or nano light-emitting diodes (micro LEDs or nano LEDs). In the following description, an organic light-emitting display device is described as an example of the display device 10 according to some embodiments of the present disclosure. It is, however, to be understood that embodiments according to the present disclosure are not limited thereto.

According to some embodiments of the present disclosure, the display device 10 includes a display panel 100, a display driver circuit 200, a display circuit board 300 and a touch driver circuit 400.

The display panel 100 may be formed in a rectangular plane having shorter sides in a first direction (x-axis direction) and longer sides in a second direction (y-axis direction) intersecting the first direction (x-axis direction). Each of the corners where the shorter sides in the first direction (x-axis direction) meet the longer sides in the second direction (y-axis direction) may be rounded with a curvature (e.g., a set or predetermined curvature) or may be a right angle. The shape of the display panel 100 when viewed from the top is not limited to a quadrangular shape, but may be formed in a different polygonal shape, a circular shape, or an elliptical shape. The display panel 100 may be formed flat, but embodiments according to the present disclosure are not limited thereto. For example, the display panel 100 includes curved portions formed at left and right ends and having a constant curvature or a varying curvature. In addition, the display panel 100 may be formed to be flexible so that it can be curved, bent, folded or rolled.

The display panel 100 includes a main area MA and a subsidiary area SBA.

The main area MA includes a display area DA where images are displayed, and a non-display area NDA around (e.g., in a periphery or outside a footprint of) the display area DA. The display area DA includes pixels for displaying images. The subsidiary area SBA may protrude from one side of the main area MA in the second direction (y-axis direction).

Although the subsidiary area SBA is unfolded in the example shown in FIGS. 1 and 2, the subsidiary area SBA may be bent (or rolled) as shown in FIG. 3 and may be located on the lower surface of the display panel 100. When the subsidiary area SBA is bent, it may overlap with the main area MA in the third direction (z-axis direction), which is the thickness direction of the substrate SUB. The display driver circuit 200 may be located in the subsidiary area SBA.

In addition, as shown in FIG. 3, the display panel 100 includes a display module DU including the substrate SUB, a thin-film transistor layer TFTL, an emission material layer EML and an encapsulation layer TFEL, and a touch sensing unit TSU formed on the front surface of the display module DU.

The thin-film transistor layer TFTL may be located on the substrate SUB. The thin-film transistor layer TFTL may be located in the main area MA and the subsidiary area SBA. The thin-film transistor layer TFTL includes thin-film transistors.

The emission material layer EML may be located on the thin-film transistor layer TFTL. The emission material layer EML may be located in the display area DA of the main area MA. The emission material layer EML includes light-emitting elements located in emission areas.

The encapsulation layer TFEL may be located on the emission material layer EML. The encapsulation layer TFEL may be located in the display area DA and the non-display area NDA of the main area MA. The encapsulation layer TFEL includes at least one inorganic layer and at least one organic layer for encapsulating the emission material layer.

The touch sensing unit TSU may be formed on the encapsulation layer TFEL or mounted on the encapsulation layer TFEL. The touch sensing unit TSU may be located on the display area DA of the main area MA. The touch sensing unit TSU may sense a touch of a person or an object using sensor electrodes.

A cover window for protecting the display panel 100 from above may be located on the touch sensing unit TSU. The cover window may be attached on the touch sensing unit TSU by a transparent adhesive member such as an optically clear adhesive (OCA) film and an optically clear resin (OCR). The cover window may be (or include) an inorganic material such as glass, or an organic material such as plastic and polymer material. In order to prevent or reduce deterioration of image visibility due to reflection of external light, a polarizing film may be further located between the touch sensing unit TSU and the cover window.

The display driver circuit 200 may generate signals and voltages for driving the display panel 100. The display driver circuit 200 may be implemented as an integrated circuit (IC) and may be attached to the display panel 100 by a chip on glass (COG) technique, a chip on plastic (COP) technique, or an ultrasonic bonding. It is, however, to be understood that embodiments according to the present disclosure are not limited thereto. For example, the display driver circuit 200 may be attached on the display circuit board 300 by the chip-on-film (COF) technique.

The display circuit board 300 may be attached to one end of the subsidiary area SBA of the display panel 100. Accordingly, the display circuit board 300 may be electrically connected to the display panel 100 and the display driver circuit 200. The display panel 100 and the display driver circuit 200 may receive digital video data, timing signals, and driving voltages through the display circuit board 300. The display circuit board 300 may be a flexible printed circuit board, a printed circuit board, or a flexible film such as a chip-on film.

The touch driver circuit 400 may be located on the display circuit board 300. The touch driver circuit 400 may be implemented as an integrated circuit (IC) and may be attached on the display circuit board 300.

The touch driver circuit 400 may be electrically connected to the touch electrodes of the touch sensing unit TSU. The touch driver circuit 400 applies touch driving signals to the touch electrodes of the touch sensing unit TSU, and measures the amount of change in the mutual capacitance of each of the plurality of touch nodes formed by the touch electrodes. For example, the touch driver circuit 400 measures a change in capacitance of the touch nodes according to a change the amount of voltage or current of a touch sensing signal received through the touch electrodes. In this manner, the touch driver circuit 400 may determine whether there is a user's touch or near proximity, based on the amount of a change in the mutual capacitance of each of the touch nodes. A user's touch refers to that an object such as the user's finger or a pen is brought into contact with a surface of the cover window located on the touch sensing unit TSU. A user's near proximity refers to that an object such as the user's finger and a pen is hovering over a surface of the cover window.

Figure 4:
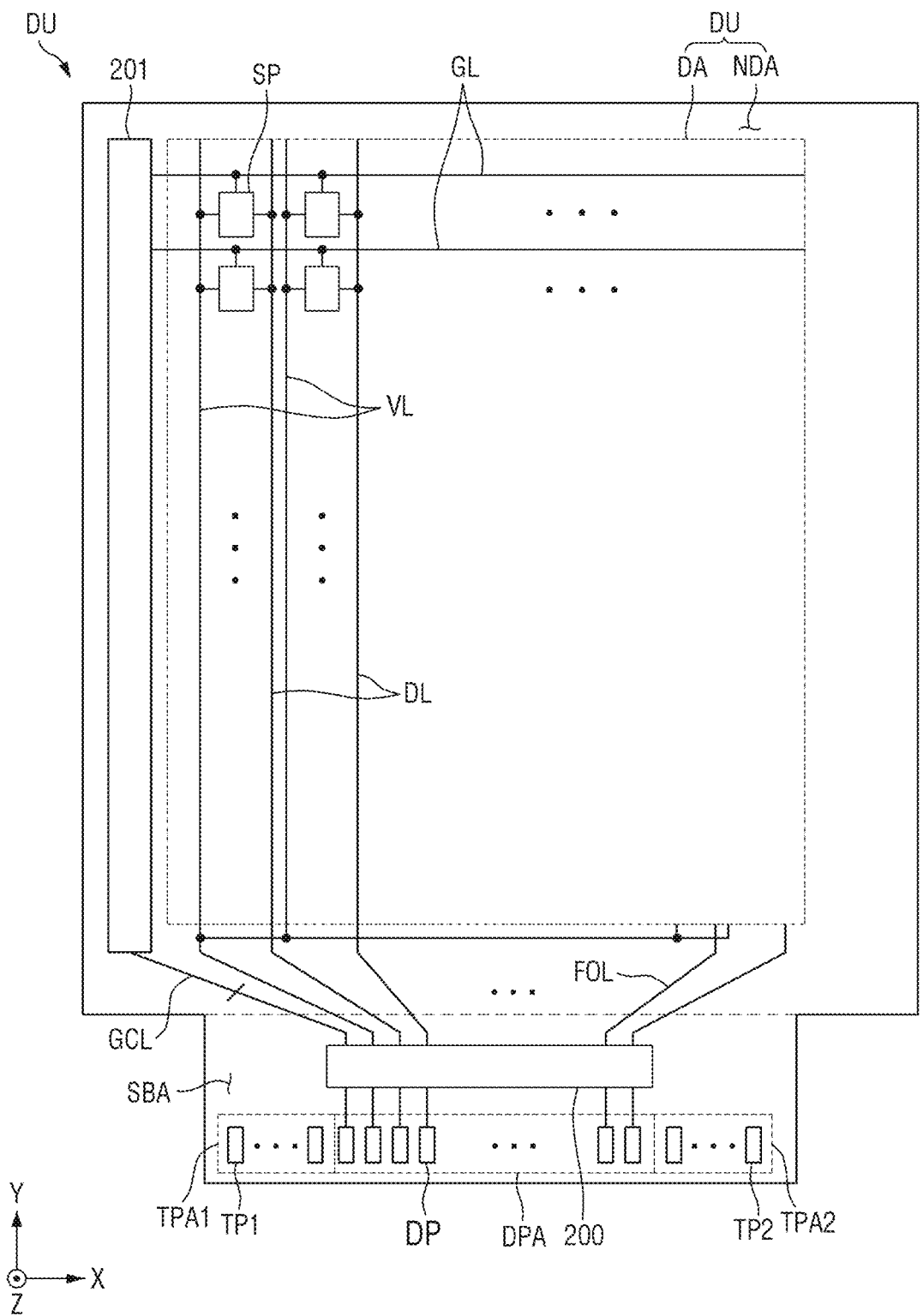
FIG. 4 is a view showing an example of a layout of the display panel shown in FIGS. to 3 according to some embodiments of the present disclosure.

FIG. 4 is a view showing an example of a layout of the display panel shown in FIGS. 1 to 3. For example, FIG. 4 is a layout view showing the display area DA and the non-display area NDA of the display module DU before the touch sensing unit TSU is formed.

The display area DA displays images therein and may be defined as a central area of the display panel 100. The display area DA may include a plurality of pixels SP, a plurality of gate lines GL, a plurality of data lines DL and a plurality of voltage lines VL. Each of the plurality of pixels SP may be defined as the minimum unit that outputs light.

The plurality of gate lines GL may supply the gate signals received from the gate driver 201 to the plurality of pixels SP. The plurality of gate lines GL may be extended in the x-axis direction and may be spaced apart from one another in the y-axis direction crossing the x-axis direction.

The plurality of data lines DL may provide the data voltages received from the display driver circuit 200 to the plurality of pixels SP. The plurality of data lines DL may be extended in the y-axis direction and may be spaced apart from one another in the x-axis direction.

The plurality of voltage lines VL may supply the supply voltage received from the display driver circuit 200 to the plurality of pixels SP. The supply voltage may be at least one of a driving voltage, an initialization voltage, or a reference voltage. The plurality of voltage lines VL may be extended in the y-axis direction and may be spaced apart from one another in the x-axis direction.

The non-display area NDA may surround the display area DA. The non-display area NDA may include the gate driver 201, fan-out lines FOL, and gate control lines GCL. The gate driver 201 may generate a plurality of gate signals based on the gate control signal, and may sequentially supply the plurality of gate signals to the plurality of gate lines GL in an order (e.g., a set or predetermined order).

The fan-out lines FOL may extend from the display driver circuit 200 to the display area DA. The fan-out lines FOL may supply the data voltage received from the display driver circuit 200 to the plurality of data lines DL.

The gate control lines GCL may be extended from the display driver circuit 200 to the gate driver 201. The gate control lines GCL may supply the gate control signal received from the display driver circuit 200 to the gate driver 201.

The subsidiary area SBA may include the display driver circuit 200, a display pad area DPA, and first and second touch pad areas TPA1 and TPA2.

The display driver circuit 200 may output signals and voltages for driving the display panel 100 to the fan-out lines FOL. The display driver circuit 200 may provide data voltages to the data lines DL through the fan-out lines FOL. The data voltages may be applied to the plurality of pixels SP, so that the luminance of the plurality of pixels SP may be determined. The display driver circuit 200 may supply a gate control signal to the gate driver 201 through the gate control lines GCL.

The display pad area DPA, the first touch pad area TPA1 and the second touch pad area TPA2 may be located on the edge of the subsidiary area SBA. The display pad area DPA, the first touch pad area TPA1 and the second touch pad area TPA2 may be electrically connected to the display circuit board 300 using a low-resistance, high-reliability material such as an anisotropic conductive film and an SAP.

The display pad area DPA may include a plurality of display pads. The plurality of display pads may be connected to the display driver circuit 200 or the touch driver circuit 400 through the display circuit board 300. The plurality of display pads may be connected to the display circuit board 300 to receive digital video data and may provide digital video data to the display driver circuit 200.

Figure 5:
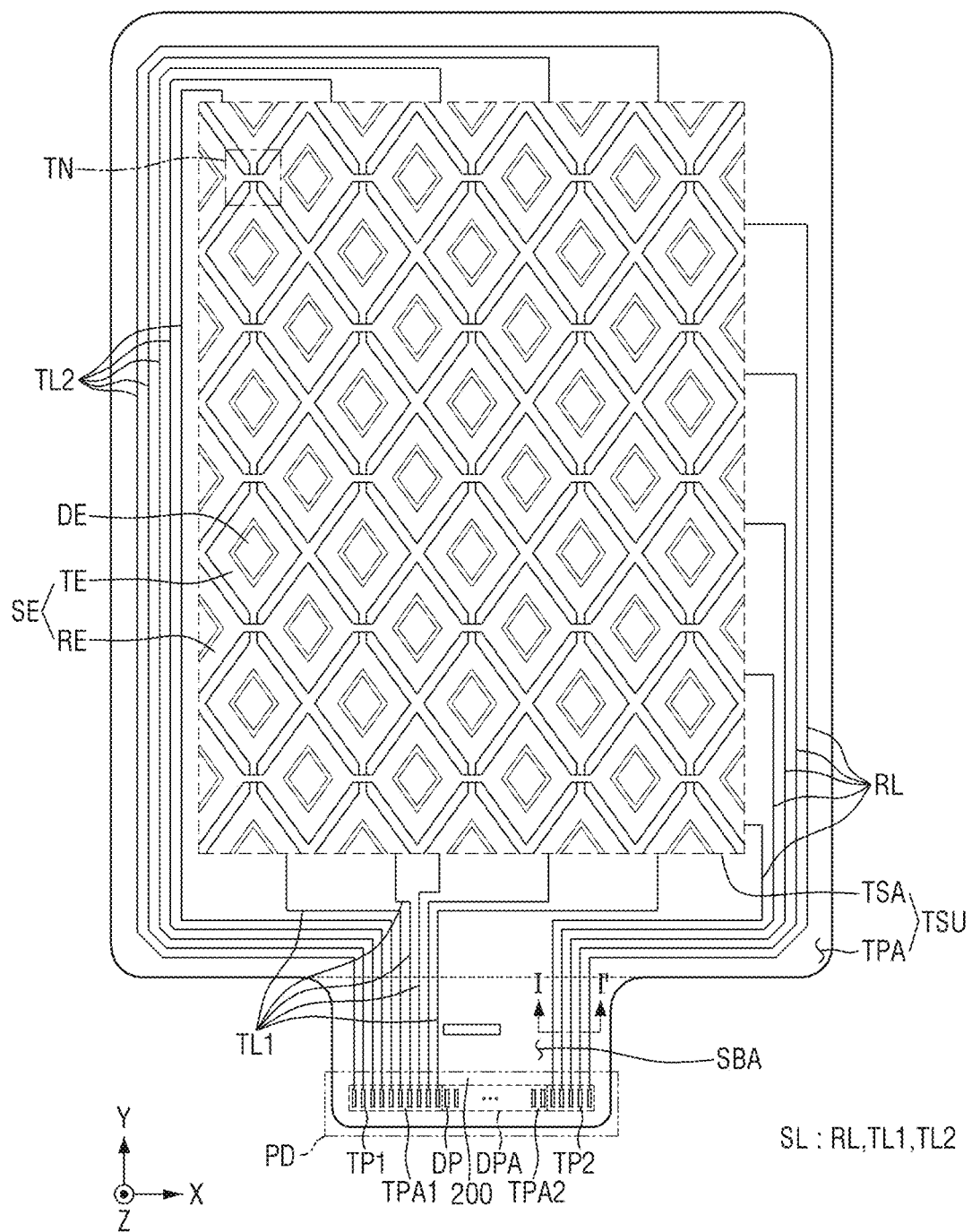
FIG. 5 is a view showing an example of a layout of a touch sensing module shown in FIG. 3 according to some embodiments of the present disclosure.

FIG. 5 is a view showing an example of a layout of a touch sensing module shown in FIG. 3.

Referring to FIG. 5, the touch electrodes SE of the main area MA include at least two kinds of electrodes, for example, the driving electrodes TE and the sensing electrodes RE. The mutual capacitive sensing is carried out by applying touch driving signals to the driving electrode TE, and then sensing the amount of change in the mutual capacitance of each of the touch nodes TN through the sensing electrodes RE. It should be noted that the type and arrangement structure of the touch electrodes SE and the method of driving the touch electrodes SE are not limited to the capacitive sensing.

For convenience of illustration, FIG. 5 shows only the driving electrodes TE, the sensing electrodes RE, dummy patterns DE, touch lines SL, and first and second touch pads TP1 and TP2.

Referring to FIG. 5, the main area MA of the touch sensing unit TSU includes a touch sensing area TSA for sensing a user's touch, and a touch peripheral area TPA located around the touch sensing area TSA. The touch sensing area TSA may overlap with the display area DA of FIGS. 1 to 3, and the touch peripheral area TPA may overlap with the non-display area NDA.

In the touch sensing area TSA, the driving electrodes TE, the sensing electrodes RE and the dummy patterns DE are located. The driving electrodes TE and the sensing electrodes RE may be electrodes for forming mutual capacitance to sense a touch of an electronic pen or a person.

The driving electrodes TE may be arranged in the first direction (x-axis direction) and second direction (y-axis direction). The driving electrodes TE adjacent to each other in the first direction (x-axis direction) are electrically separated from to each other, while the driving electrodes TE adjacent to each other in the second direction (y-axis direction) are electrically connected to each other. The driving electrodes TE adjacent to one another in the second direction (y-axis direction) may be connected through separated connection electrodes.

The sensing electrodes RE may be arranged in the first direction (x-axis direction) and second direction (y-axis direction). The sensing electrodes RE adjacent to each other in the first direction (x-axis direction) may be electrically connected with each other in the first direction (x-axis direction). In addition, the sensing electrodes RE adjacent to each other in the second direction (y-axis direction) may be electrically separated from each other. Accordingly, touch nodes TN where mutual capacitance is formed may be formed at intersections of the driving electrodes TE and the sensing electrodes RE. A plurality of touch nodes TN may be associated with the intersections of the driving electrodes TE and the sensing electrodes RE, respectively.

Each of the dummy patterns DE may be surrounded by the driving electrode TE or the sensing electrode RE. Each of the dummy patterns DE may be electrically separated from the driving electrode TE or the sensing electrode RE. Each of the dummy patterns DE may be spaced apart (e.g., in a plan view) from the driving electrode TE or the sensing electrode RE. Each of the dummy patterns DE may be electrically floating.

In FIG. 5, the driving electrodes TE, the sensing electrodes RE and the dummy patterns DE each have a diamond shape when viewed from the top (e.g., a plan view, or a view perpendicular or normal with respect to a plane that is parallel to a display surface of the display panel 100), but embodiments according to the present disclosure are not limited thereto. For example, each of the driving electrodes TE, the sensing electrodes RE and the dummy patterns DE may have other quadrangular shape than a diamond, other polygonal shapes than a quadrangular shape, a circle or an ellipse when viewed from the top.

Touch lines SL may be located around the touch sensing area TSA, i.e., in the touch peripheral area TPA. The touch lines SL include first touch driving lines TL1 and second touch driving lines TL2 connected to the driving electrodes TE, and touch sensing lines RL connected to the sensing electrodes RE.

The sensing electrodes RE located on one side of the touch sensing area TSA may be connected to the touch sensing lines RL, respectively. For example, some of the sensing electrodes RE electrically connected with one another in the first direction (x-axis direction) that are located at the right end may be connected to the sensing lines RL, respectively, as shown in FIG. 5. Each of the touch sensing lines RL may be connected to a pad unit PD via a portion of the touch peripheral area TPA. For example, the touch sensing lines RL may be extended around the right side of the touch sensing area TSA and may be connected to second touch pads TP2 located in the pad unit PD, respectively.

The driving electrodes TE located at one end of the touch sensor area TSA may be connected to the first driving lines TL1, respectively, while the driving electrodes TE located at the opposite end of the touch sensor area TSA may be connected to the second driving lines TL2, respectively. For example, some of the driving electrodes TE electrically connected to one another in the second direction (y-axis direction) that are located at the lower end may be connected to the first touch driving lines TL1, respectively, while some of the driving electrodes TE located at the upper end may be connected to the second touch driving lines TL2, respectively.

The first or second touch driving lines TL1 and TL2 may be connected to the pad unit PD formed in the subsidiary area SBA of the display panel 100 via a portion of the touch peripheral area TPA. For example, the second touch driving lines TL2 may be extended around the left side of the touch sensing area TSA and connected to the driving electrodes TE on the upper side of the touch sensing area TSA. In addition, the first and second touch driving lines TL1 and TL2 may be connected to the pad unit PD formed in the subsidiary area SBA on the lower side of the touch sensing area TSA. The first and second touch driving lines TL1 and TL2 may be connected to first touch pads TP1 located on the pad unit PD, respectively.

The driving electrodes TE are connected to the first and second touch driving lines TL1 and TL2 on the two sides of the touch sensing area TSA to receive touch driving signals through the first and second touch driving lines TL1 and TL2 on the two sides. Accordingly, it may be possible to prevent or reduce a difference between the touch driving signals applied to the driving electrodes TE located on the lower side of touch sensing area TSA and the touch driving signals applied to the driving electrodes TE located on the upper side of the touch sensing area TSA due to a RC delay of the touch driving signals.

As shown in FIGS. 1 to 3, when the display circuit board 300 is connected to one side of the flexible film, the display pad area DPA and the first and second touch pad areas TPA1 and TPA2 of the pad area PD may be associated with pads of the display panel 100 connected to the display circuit board 300. Accordingly, the pads of the display panel 100 may be in contact with the display pads DP, the first touch pads TP1 and the second touch pads TP2. The display pads DP, the first touch pads TP1 and the second touch pads TP2 may be electrically connected to the pads of the display circuit board 300 using a low-resistance, high-reliability material such as an anisotropic conductive film and an SAP. Therefore, the display pads DP, the first touch pads TP1 and the second touch pads TP2 may be electrically connected to the touch driver circuit 400 located on the display circuit board 300.

Figure 6:
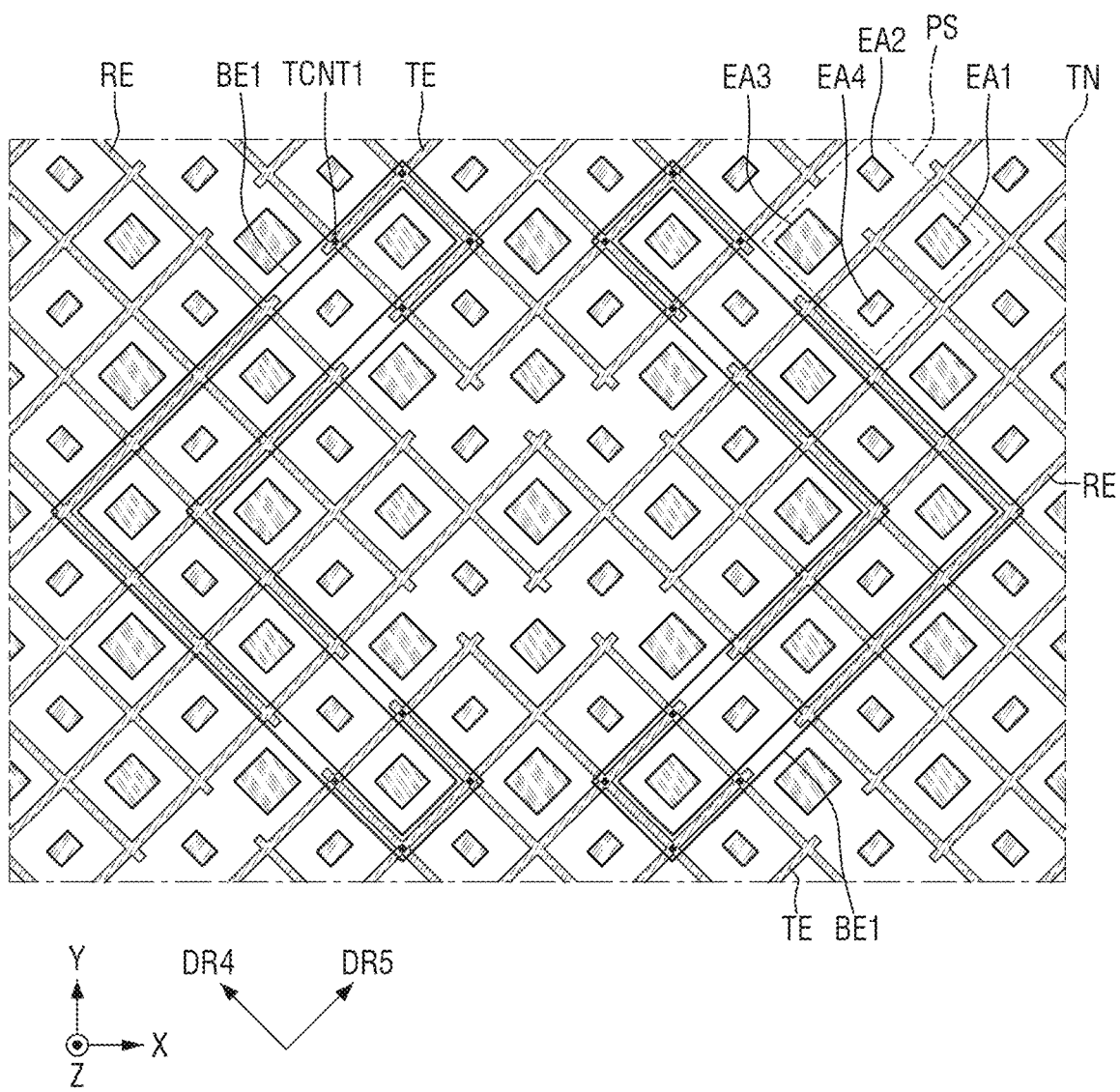
FIG. 6 is an enlarged, plan view showing an example of the touch nodes of FIG. 5 in more detail according to some embodiments of the present disclosure.

FIG. 6 is an enlarged, plan view showing an example of the touch nodes of FIG. 5 in detail.

Referring to FIG. 6, the touch nodes TN may be defined as the intersections of the driving electrodes TE and the sensing electrodes RE.

The driving electrodes TE and the sensing electrodes RE are located on the same layer and thus they may be spaced apart from each other. That is to say, there may be a gap between adjacent ones of the driving electrodes TE and the sensing electrodes RE.

In addition, the dummy patterns DE may also be located on the same layer as the driving electrodes TE and the sensing electrodes RE. That is to say, there may be a gap between adjacent ones of the driving electrodes TE and the dummy patterns DE and between adjacent ones of the sensing electrodes RE and the dummy patterns DE.

The bridge electrodes BE1 may be located on a different layer from the driving electrodes TE and the sensing electrodes RE. Each of the bridge electrodes BE1 may be bent at least once.

Although the bridge electrodes BE1 have the shape of angle brackets "<" or ">" in the example shown in FIG. 6, the shape of the bridge electrodes BE1 when viewed from the top is not limited thereto. Because the driving electrodes TE adjacent to each other in the second direction (y-axis direction) are connected by the plurality of bridge electrodes BE1, even if any of the bridge electrodes BE1 is disconnected, the driving electrodes TE can still be stably connected with each other. Although two adjacent ones of the driving electrodes TE are connected by two bridge electrodes BE1 in the example shown in FIG. 6, the number of bridge electrodes BE1 is not limited to two.

The bridge electrodes BE1 may overlap the driving electrodes TE adjacent to one another in the second direction (y-axis direction) in the third direction (z-axis direction), which is the thickness direction of the substrate SUB. The bridge electrodes BE1 may overlap the sensing electrodes RE in the third direction (z-axis direction). One side of each of the bridge electrodes BE1 may be connected to one of the driving electrodes TE adjacent to each other in the second direction (y-axis direction) through touch contact holes TCNT1. The other side of each of the bridge electrodes BE1 may be connected to another one of the driving electrodes TE adjacent to each other in the second direction (y-axis direction) through touch contact holes TCNT1.

The driving electrodes TE and the sensing electrodes RE may be electrically separated from each other at their intersections by virtue of the bridge electrodes BE1. Accordingly, mutual capacitance can be formed between the driving electrodes TE and the sensing electrodes RE.

Each of the driving electrodes TE, the sensing electrodes RE and the bridge electrodes BE1 may have a mesh structure or a net structure when viewed from the top. In addition, each of the dummy patterns DE may have a shape of a mesh structure or a net structure when viewed from the top. Accordingly, the driving electrodes TE, the sensing electrodes RE, the bridge electrodes BE1 and the dummy patterns DE may not overlap with the emission areas EA1, EA2, EA3 and EA4 of each of the pixels PS. Therefore, it may be possible to prevent or reduce instances of the luminance of the lights emitted from the emission areas EA1, EA2, EA3 and EA4 being lowered, which may occur as the lights are covered by the driving electrodes TE, the sensing electrodes RE, the bridge electrodes BE1 and the dummy patterns DE.

Each of the pixels PS includes a first emission area EMA1 that emits light of a first color, a second emission area EMA2 that emits light of a second color, a third emission area EMA3 that emits light of a third color, and a fourth emission area EMA4 that emits light of the second color. For example, the first color may be red, the second color may be green, and the third color may be blue. Alternatively, the first and third emission areas EA1 and EA3 may emit green light which is light of the second color, the second emission area EA2 may emit red light which is light of the first color, and the fourth emission area EA4 may emit blue light which is light of the third color.

In each of the pixels PS, the first emission area EA1 and second emission area EA2 may be adjacent to each other in a fourth direction DR4 which is a diagonal direction, and the third emission area EA3 and the fourth emission area EA4 may be adjacent to each other in the fourth direction DR4. In each of the pixels PS, the first emission area EA1 and the fourth emission area EA4 may be adjacent to each other in a fifth direction DR5 which is a diagonal direction intersecting the fourth direction DR4, and the second emission area EA2 and the third emission area EA3 may be adjacent to each other in the fifth direction DR5.

Each of the first emission area EA1, the second emission area EA2, the third emission area EA3 and the fourth emission area EA4 may have, but is not limited to, a diamond or a rectangular shape when viewed from the top (e.g., in a plan view). Each of the first emission area EA1, the second emission area EA2, the third emission area EA3 and the fourth emission area EA4 may have other polygonal shape than a quadrangular shape, a circular shape, or an elliptical shape when viewed from the top (e.g., in a plan view). In addition, although the third emission area EA3 is the largest while the second emission area EA2 and the fourth emission area EA4 are the smallest in the example shown in FIG. 6, embodiments according to the present disclosure are not limited thereto.

The second emission areas EA2 and the fourth emission areas EA4 may be arranged in odd rows. The second emission areas EA2 and the fourth emission areas EA4 may be arranged side by side in each of the odd rows in the first direction (x-axis direction). The second emission areas EA2 and the fourth emission areas EA4 may be arranged alternately in odd rows. Each of the second emission areas EA2 may have shorter sides in the fourth direction DR4 and longer sides in the fifth direction DR5, while each of the fourth emission areas EA4 may have longer sides in the fourth direction DR4 and shorter sides in the fifth direction DR5. The fourth direction DR4 may refer to the direction between the first direction (x-axis direction) and the second direction (y-axis direction), which be inclined from the first direction (x-axis direction) by forty-five degrees. The fifth direction DR5 may be a direction perpendicular to the fourth direction DR4.

The first emission areas EA1 and the third emission areas EA3 may be arranged in even rows. The first emission areas EA1 and the third emission areas EA3 may be arranged side by side in each of the even rows in the first direction (x-axis direction). The first emission areas EA1 and the third emission areas EA3 may be alternately arranged in each of the even rows.

The second emission areas EA2 and the fourth emission areas EA4 may be arranged in odd columns. The second emission areas EA2 and the fourth emission areas EA4 may be arranged side by side in each of the odd columns in the second direction (y-axis direction). The second emission areas EA2 and the fourth emission areas EA4 may be arranged alternately in each of the odd columns.

The first emission areas EA1 and the third emission areas EA3 may be arranged in even columns. The first emission areas EA1 and the third emission areas EA3 may be arranged side by side in each of the even columns in the second direction (y-axis direction). The first emission areas EA1 and the third emission areas EA3 may be alternately arranged in each of the even columns.

As described above, the touch driver circuit 400 applies touch driving signals to the driving electrodes TE among the touch electrodes SE arranged perpendicular to one another during a touch sensing period. In addition, the amount of changes in the mutual capacitance of each of the plurality of touch nodes TN is sensed through the sensing electrodes RE. At this time, the touch driver circuit 400 measures the magnitude of the voltage of the touch driving signals fed back from the driving electrodes TE and the magnitude of the voltage of the sensing signals input through the sensing electrodes RE, to generate touch voltage map data based on the positions of the touch nodes TN. Based on the difference in the magnitude of the voltage of each of the touch nodes TN in the touch voltage map data, it may be possible to detect the amount of change in the mutual capacitance of each of the touch nodes TN and the touch positions (or touch position coordinates).

Meanwhile, the touch driver circuit 400 applies a first sensing reference voltage for temperature sensing to the driving electrodes TE among the touch electrodes SE arranged perpendicular to one another during a temperature sensing period of the display panel 100. In addition, the amount of changes in the mutual capacitance of each of the plurality of touch nodes TN is sensed through the sensing electrodes RE. At this time, the touch driver circuit 400 measures the magnitude of the first sensing reference voltage fed back from the driving electrodes TE and the magnitude of the sensing voltage input through the sensing electrodes RE, to generate first temperature sensing map data based on the positions of the touch nodes TN. It may be possible to detect changes in the temperature of the entire display panel 100 or each region based on the difference in the magnitude of voltage of each touch node TN in the first temperature sensing map data.

On the other hand, during the temperature sensing period of the display panel 100, the display driver circuit 200 may apply a second sensing reference voltage for temperature sensing to the plurality of data lines DL arranged in parallel in the second direction (y-axis direction). Then, the touch driver circuit 400 senses change in the mutual capacitance of each of the nodes where the data lines DL and the sensing lines RE intersect each other through the sensing electrodes RE that intersect the data lines DL or are arranged in the first direction (x-axis direction) perpendicular to the data lines DL. At this time, the touch driver circuit 400 may measure the second sensing reference voltage fed back from the data lines DL to transmit the measured data to the display driver circuit 200. Alternatively, the touch driver circuit 400 may measure the magnitude of the second sensing reference voltage fed back from the data lines DL and the magnitude of the sensing voltage input through the sensing electrodes RE. Accordingly, the touch driver circuit 400 measures the magnitude of the second sensing reference voltage fed back from the data lines DL and the magnitude of the sensing voltage input through the sensing electrodes RE, to generate second temperature sensing map data based on the positions of the touch nodes TN. It may be possible to detect changes in the temperature of the entire display panel 100 or each region based on the difference in the magnitude of voltage of each touch node TN in the first temperature sensing map data.

The touch driver circuit 400 may generate and accumulate first temperature sensing map data at least every frame during the temperature sensing period of the display panel 100 to form first accumulated temperature sensing data. In addition, the touch driver circuit 400 may accumulate the second temperature sensing map data at least every frame to form the second accumulated temperature sensing data. Accordingly, the touch driver circuit 400 may divide the display area DA of the display panel 100 into a central area, an outer area and an edge area, and may match the first or second accumulated temperature data with each of the central area, the outer area and the edge area of the display area DA to generate accumulated temperature map data of the display panel 100.

In addition, the touch driver circuit 400 may apply different weights to the central area, the outer area and the edge area of the display area DA to match the first or second accumulated temperature data with each of them with the different weights, and may generate accumulated temperature map data. In doing so, different weights may be applied to the center area, the outer area and the edge area of the display area DA according to the temperature detection accuracy of the first or second accumulated temperature data.

Figure 7:
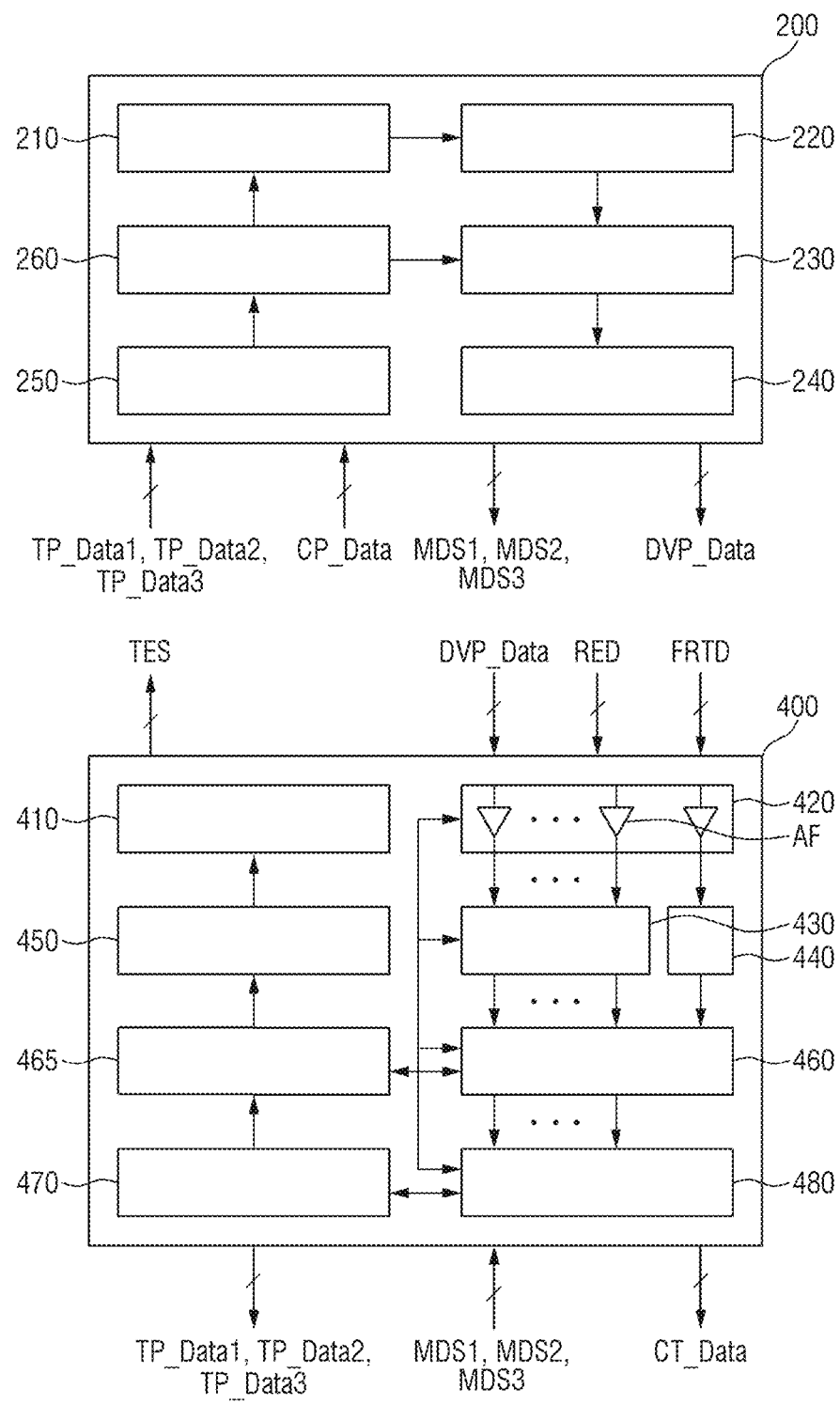
FIG. 7 is a block diagram showing in detail the display driver circuit and the touch driver circuit shown in FIGS. 1 to 4 according to some embodiments of the present disclosure.

FIG. 7 is a block diagram showing in more detail the display driver circuit and the touch driver circuit shown in FIGS. 1 to 4.

Referring to FIG. 7, the display driver circuit 200 includes a timing controller 210, a control signal generator 220, a data driver 230, a sensing voltage output 240, a map data input 250, and a compensation data generator 260.

During the temperature sensing period of a standby period when no image is displayed, the display driver circuit 200 selects one of first to third temperature sensing modes, and transmits one of first to third mode sensing control signals MDS1, MDS2 and MDS3 to the touch driver circuit 400 according to the selected temperature sensing mode. Then, the display driver circuit 200 compensates for image data according to the difference in the temperature of the display area DA based on one of first to third temperature sensing map data TP_Data1, TP_Data2 and TP_Data3 generated by the touch driver circuit 400. In this manner, the image according to the compensated image data is displayed on the display area DA.

To this end, the timing controller 210 of the display driver circuit 200 controls image display timing of image data during an image display period, and selects a temperature sensing mode to generate and output mode sensing control signals MDS1, MDS2 and MDS3 according to the selected temperature sensing mode during the temperature sensing period.

For example, during the image display period, the timing controller 210 supplies synchronization signals from the outside to the control signal generator 220 and supplies image data from the outside to the data driver 230.

The timing controller 210 selects one of the first to third temperature sensing modes according to interface information input from a user or an administrator during a temperature sensing period (e.g., a set or predetermined temperature sensing period) in which no image is displayed, and generates one of the first to third mode sensing control signals MDS1, MDS2 and MDS3 according to the selected temperature sensing mode. The timing controller 210 transmits one of the first to third mode sensing control signals MDS1, MDS2 and MDS3 generated in real time to the touch driver circuit 400. In doing so, the second or third mode sensing control signals MDS2 and MDS3 may also be supplied to the sensing voltage output 240.

The control signal generator 220 generates a gate control signal for controlling the timing of outputting gate signals from the gate driver 201 in response to a synchronization signal input through the timing controller 210 during the image display period. The control signal generator 220 supplies a gate control signal to the gate driver 201 so that the gate signals are sequentially supplied to the gate lines GL of the display panel 100 during the image display period. In addition, the control signal generator 220 generates a data control signal for controlling the timing of outputting the data voltage from the data driver 230 in response to a synchronization signal during the image display period. The control signal generator 220 supplies a data control signal to the data driver 230 so that the data voltage is supplied to the data lines DL of the display panel 100 during the image display period.

During the image display period, the data driver 230 aligns the image data input through the timing controller according to the resolution and driving frequency characteristics of the display panel 100, and generates an analog data voltage according to the grayscale value of the aligned image data. Then, the data driver 230 outputs data voltages to the data lines DL at least every horizontal line driving period in response to the data control signal.

The sensing voltage output 240 provides a second sensing reference voltage DVP_Data for temperature sensing to each of the data lines DL in response to at least one sensing control signal among the sensing control signals input during the temperature sensing period.

For example, the sensing voltage output 240 may receive the second or third mode sensing control signal MDS2 or MDS3 from the timing controller 210 during the temperature sensing period, and may generate the second sensing reference voltage DVP_Data for temperature sensing whenever the second or third mode sensing control signal MDS2 or MDS3 is input to output it to each of the data lines DL. The magnitude of the second sensing reference voltage DVP_Data may be predetermined for sensing the temperature of the display panel 100 and may be generated as a voltage larger than the data voltage of the highest grayscale value.

The map data input 250 receives and stores touch coordinate data CT_Data input from the touch driver circuit 400 during the image display period, and receives and stores at least one temperature sensing map data TP_Data1, TP_Data2 and TP_Data3 input from the touch driver circuit 400 during the temperature sensing period. The stored touch coordinate data CT_Data is shared with the timing controller 210, and the stored at least one temperature sensing map data TP_Data1, TP_Data2 and TP_Data3 is shared with the compensation data generator 260.

The compensation data generator 260 sets compensation values according to a difference in the capacitance of each of the touch nodes TN included in at least one of the temperature sensing map data TP_Data1, TP_Data2, or TP_Data3, and aligns the compensation values with the positions of the touch nodes TN to provide them to the data driver 230. Accordingly, the data driver 230 generates compensation data by calculating the compensation values for the positions of the touch nodes TN on the image data aligned according to the resolution of the display panel 100. In doing so, the data driver 230 may generate the compensated image data by multiplying or adding a grayscale value or luminance value of image data associated with the position of each of the touch nodes TN by or to the compensation values for the touch nodes TN. The data driver 230 may generate an analog data voltage according to the compensated grayscale value of the compensated image data to output it to each of the data lines DL.

Referring to FIG. 7, the touch driver circuit 400 includes a driving signal output 410, a sensing circuit 420, an analog-to-digital converter 430, a current detector 440, a touch driving controller 450, a touch coordinate data generator 460, a data communication unit 465, a temperature sensing controller 470, and a sensing map data generator 480.

For example, the driving signal output 410 supplies the touch driving signal TES to the driving electrodes TE of the touch sensing unit TSU in response to the touch sensing control signal input from the touch driving controller 450 during the touch sensing period. At this time, the driving signal output 410 outputs the touch driving signals TES from the driving electrode TE located at the leftmost position of the touch sensing area TSA to the driving electrode TE located at the rightmost position in response to a touch driving control signal. For example, the touch driving signals may be supplied as multiple pulse signals generated with the magnitude of 1.8 V.

The driving signal output 410 selectively provides a first sensing reference voltage TPS to the driving electrodes TE in response to at least one of the first or third mode sensing control signals MDS1 or MDS3 input from the temperature sensing controller 470 during the temperature sensing period. During the temperature sensing period, the driving signal output 410 may provide the first sensing reference voltage TPS to the driving electrodes TE in response to the first mode sensing control signal MDS1 during the period in which the first mode sensing control signal MDS1 is input. For example, the first sensing reference voltage TPS may be supplied as a plurality of pulse signals generated with the magnitude of 1 V. In addition, during the temperature sensing period, the driving signal output 410 may provide the first sensing reference voltage TPS to the driving electrodes TE in response to the third mode sensing control signal MDS3 whenever the third mode sensing control signal MDS3 is input.

The sensing circuit 420 detects the driving voltages FRTD fed back from the driving electrodes TE of the touch sensing unit TSU and sensing voltages RED detected through the sensing electrodes RE to sense the amount of changes in the mutual capacitance of each of the touch nodes TN.

For example, the sensing circuit 420 detects the driving voltages FRTD fed back from the driving electrodes TE of the touch sensing unit TSU and sensing voltages RED detected through the sensing electrodes RE to sense the amount of changes in the mutual capacitance of each of the touch nodes TN in response to the touch sensing control signal input from the touch driving controller 450 during the touch sensing period.

On the other hand, during the temperature sensing period, the sensing circuit 420 detects the first sensing reference voltages TPS fed back from the driving electrodes TE and the sensing voltages RED detected through the sensing electrodes RE to sense the amount of changes in the mutual capacitance of each of the touch nodes TN in response to the first mode sensing control signal input from the temperature sensing controller 470.

Alternatively, during the temperature sensing period, the sensing circuit 420 detects the second sensing reference voltages DVP_Data fed back from the data lines DL of the display panel 100 and the sensing voltages RED detected through the sensing electrodes RE to sense the amount of changes in the mutual capacitance of each of the touch nodes TN where the data lines DL and the sensing electrodes RE intersect each other in response to the second mode sensing control signal MDS2 input from the temperature sensing controller 470.

During the touch sensing period, the analog-to-digital converter 430 sequentially converts the output voltages according to the amount of changes in the capacitance of each of the touch nodes TN detected through the sensing circuit 420 into touch data which is digital data. The touch data sequentially converted by the analog-to-digital converter 430 is transmitted to the touch coordinate data generator 480 in real time.

The analog-to-digital converter 430 sequentially converts the output voltages detected through the sensing circuit 420 into digital temperature data during the temperature sensing period in which the first or third mode sensing control signals MDS1 and MDS3 are input. The temperature data sequentially converted by the analog-to-digital converter 430 are transmitted to the sensing map data generator 480 in real time.

The current detector 440 detects the amount of current of at least one of the amounts of current of the sensing electrodes RE or the touch sensing lines RL detected through the sensing circuit 420 and shares it with the touch driving controller 450. Depending on the current detection operation and the amount of detected current of the current detector 440, the touch driving controller 450 may determine whether to perform a temperature sensing operation during the temperature sensing period. The touch driving controller 450 interrupts the touch sensing operation during the temperature sensing period.

The touch driving controller 450 sets the image display period of the display driver circuit 200 as the touch sensing period. The touch driving controller 450 generates the touch sensing control signal during the touch sensing period and supplies it to the driving signal output 410 and the sensing circuit 420. In addition, the touch driving controller 450 provides the touch sensing control signal to the touch coordinate data generator 460 to control the operations of generating and outputting touch coordinate data CT_Data by the touch coordinate data generator 460.

During the touch sensing period when the touch sensing control signal is input, the touch coordinate data generator 460 sequentially aligns the touch data output from the analog-to-digital converter 430 to generate touch coordinate data CT_Data. The touch coordinate data generator 460 transmits the touch coordinate data CT_Data generated in real time during the touch sensing period to the display driver circuit 200.

The data communication unit 465 includes at least one data communication module. Accordingly, the data communication unit 465 transmits the touch coordinate data CT_Data generated in real time during the touch sensing period to the display driver circuit 200. In addition, when at least one of the first to third mode sensing control signals MDS1, MDS2, or MDS3 is received from the display driver circuit 200 during the temperature detection period, the data communication unit 465 may transmit the received mode sensing control signal to the driving signal output 410, the sensing circuit 420, the temperature sensing controller 470 and the sensing map data generator 480.

The temperature sensing controller 470 controls the output operation of the first sensing reference voltage TPS by the driving signal output 410 in response to at least one of the first to third mode sensing control signals MDS1, MDS2, or MDS3 input during the temperature sensing period. At the same time, the temperature sensing controller 470 provides at least one mode sensing control signal to the sensing circuit 420 to control the detecting operation of the feedback driving voltages FRTD and the sensing voltages RED by the sensing circuit 420. For example, the temperature sensing controller 470 may provide the first mode sensing control signal MDS1 to the sensing circuit 420 during the temperature sensing period. Accordingly, the sensing circuit 420 detects the first sensing reference voltage TPS fed back from the driving electrodes TE and the sensing voltages RED detected through the sensing electrodes RE to sense the amount of changes in the mutual capacitance of each of the touch nodes TN. Alternatively, the temperature sensing controller 470 may provide the third mode sensing control signal MDS3 to the sensing circuit 420 during the temperature sensing period. Accordingly, the sensing circuit 420 detects the second sensing reference voltages DVP_Data fed back from the data lines DL of the display panel 100 and the sensing voltages RED detected through the sensing electrodes RE to sense the amount of changes in the mutual capacitance of each of the touch nodes TN where the data lines DL and the sensing electrodes RE intersect each other.

The sensing map data generator 480 receives at least one of the first to third mode sensing control signals MDS1, MDS2, or MDS3 through the data communication unit 465 or the temperature sensing controller 470 during the temperature sensing period.

The sensing map data generator 480 generates first temperature sensing map data TP_Data1 in response to the first mode sensing control signal MDS1, and generates second temperature sensing map data TP_Data2 in response to the second mode sensing control signal MDS2. The sensing map data generator 480 generates third temperature sensing map data TP_Data3 in response to the third mode sensing control signal MDS3.

In particular, the sensing map data generator 480 may generate first temperature sensing map data TP_Data1 at least every frame in response to the third mode sensing control signal MDS3 and may accumulate the first temperature sensing map data TP_Data1 to form the first accumulated temperature sensing data. In addition, the sensing map data generator 480 may accumulate the second temperature sensing map data TP_Data2 at least every frame to form the second accumulated temperature sensing data.

Accordingly, the sensing map data generator 480 may divide the display area DA of the display panel 100 into a central area, an outer area and an edge area, and may match the first or second accumulated temperature data with each of the central area, the outer area and the edge area of the display area DA to generate accumulated temperature map data of the display panel 100, i.e., the third temperature sensing map data TP_Data3.

The sensing map data generator 480 may apply different weights to the central area, the outer area and the edge area of the display area DA to match the first or second accumulated temperature data with each of them with the different weights, and may generate the third temperature sensing map data TP_Data3. In doing so, different weights may be applied to the center area, the outer area and the edge area of the display area DA according to the temperature detection accuracy of the first or second accumulated temperature data.

Figure 8:
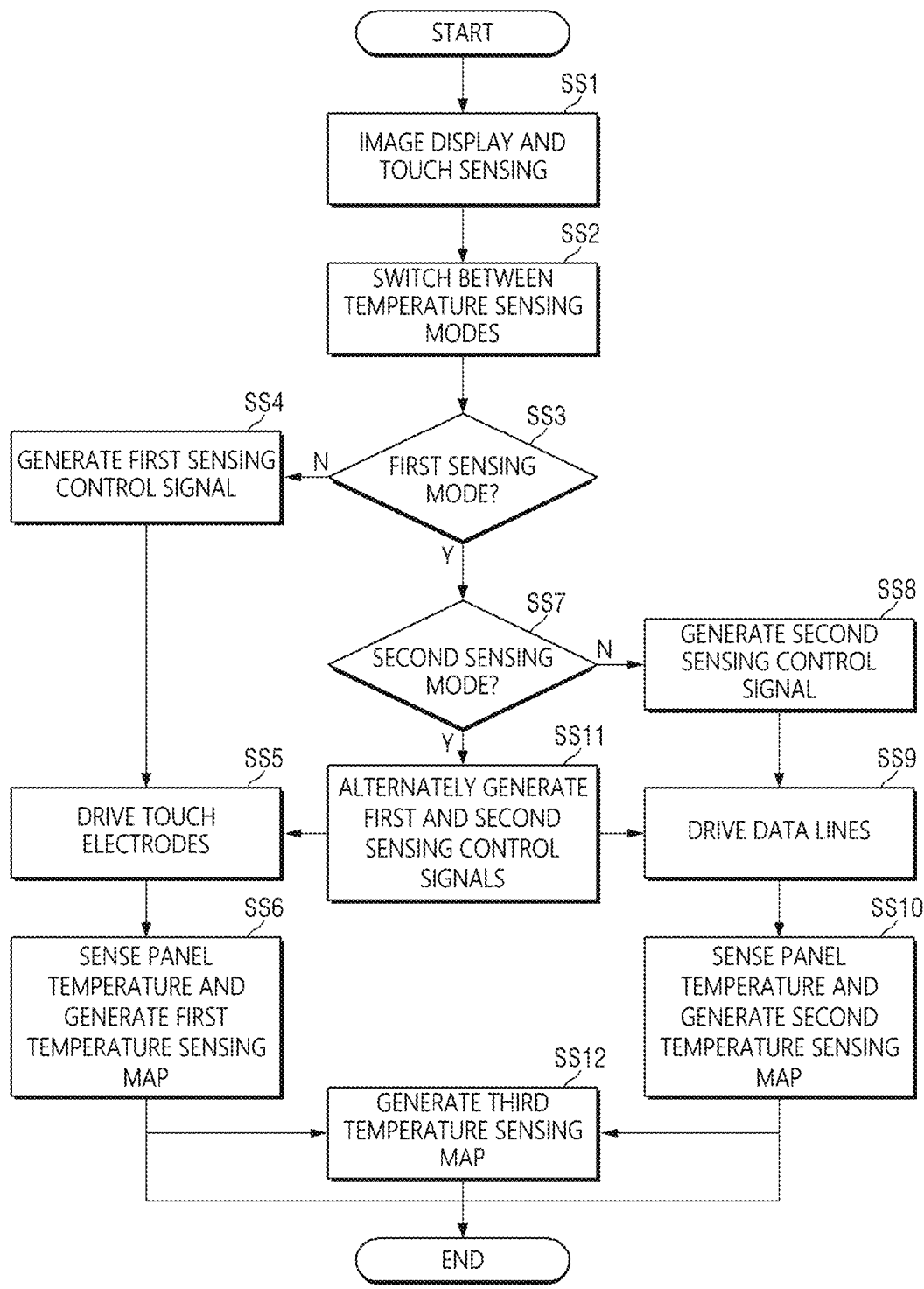
FIG. 8 is a flowchart for illustrating a method of sensing a temperature of a display panel and a method of generating a temperature sensing map according to some embodiments of the present disclosure.

FIG. 8 is a flowchart for illustrating a method of sensing a temperature of a display panel and a method of generating a temperature sensing map according to some embodiments of the present disclosure.

Referring to FIG. 8, the display driver circuit 200 generates signals and data voltages for driving the display panel 100 during the image display period, and supplies image data to the display panel 100 to display the image. At this time, the touch driver circuit 400 applies touch driving signals to the touch electrodes SE of the touch sensing unit TSU, and measures the amount of change in the mutual capacitance of each of the plurality of touch nodes formed by the touch electrodes SE. The touch driver circuit 400 may determine whether there is a user's touch or near proximity, based on the amount of the change in the mutual capacitance of each of the plurality of touch nodes TN (step SS1).

The timing controller 210 of the display driver circuit 200 selects one of the first to third temperature sensing modes according to interface information input from a user or an administrator during a temperature sensing period (e.g., a set or predetermined temperature sensing period) in which no image is displayed (step SS2). At this time, the timing controller 210 may select a first temperature sensing mode so that the touch driver circuit 400 can generate the first temperature sensing map data TP1_Data1 using the touch electrodes SE (step SS3).

The timing controller 210 generates the first mode sensing control signal MDS1 among the first to third mode sensing control signals MDS1, MDS2 and MDS3 in response to the selected first temperature sensing mode, and transmits the first mode sensing control signal MDS1 to the touch driver circuit 400 (step SS4).

The temperature sensing controller 470 of the touch driver circuit 400 controls the output operation of the first sensing reference voltage TPS by the driving signal output 410 in response to the first mode sensing control signal MDS1. At the same time, the temperature sensing controller 470 controls the detecting operation of the feedback driving voltages FRTD and the sensing voltages RED by the sensing circuit 420. Accordingly, the driving signal output 410 of the touch driver circuit 400 provides the first sensing reference voltage TPS to the driving electrodes TE. Then, the sensing circuit 420 detects the driving voltages FRTD fed back from the driving electrodes TE and the sensing voltages RED detected through the sensing electrodes RE to sense the amount of changes in the mutual capacitance of each of the touch nodes THAN (step SS5).

Figure 9:
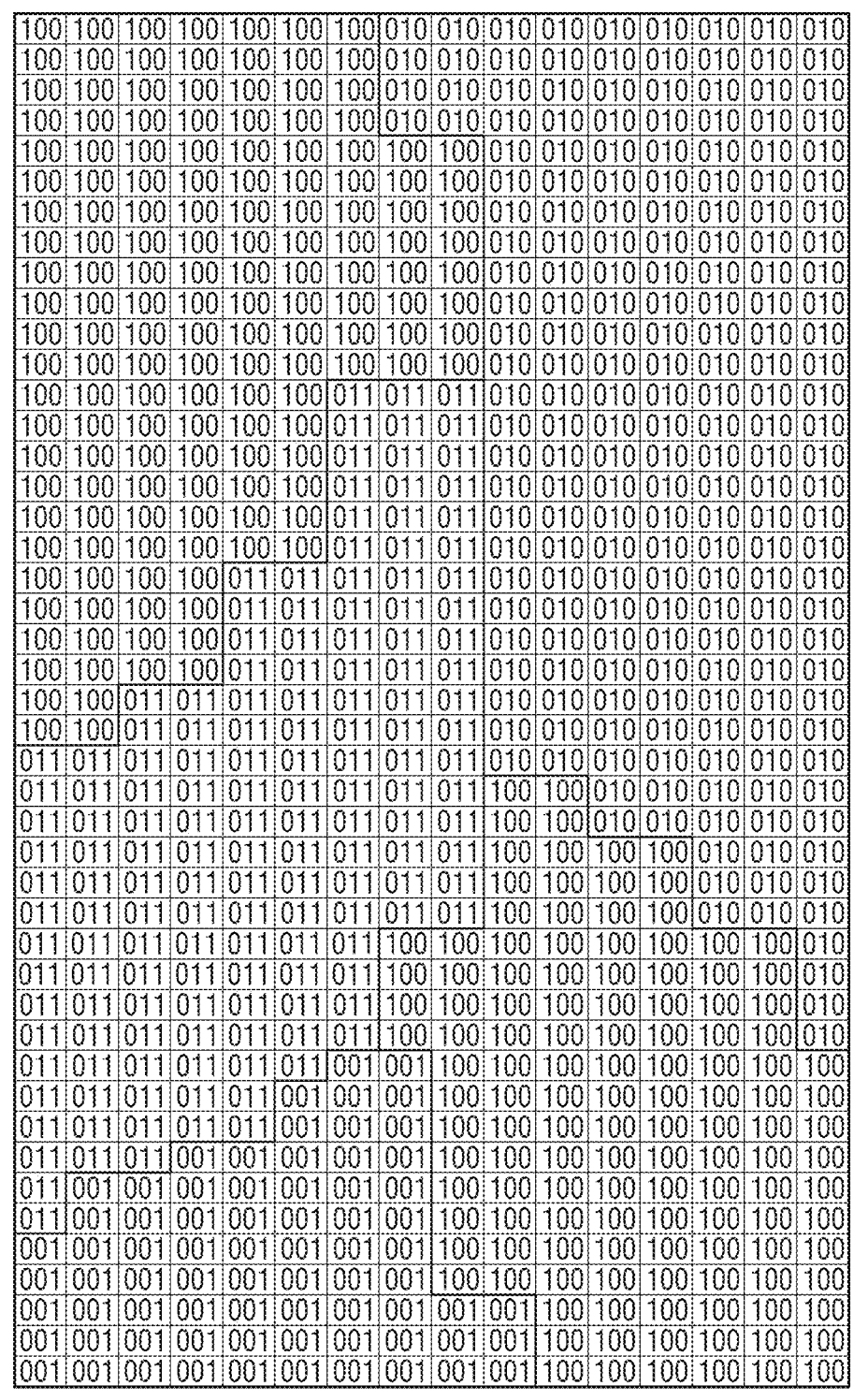
Figure 10:
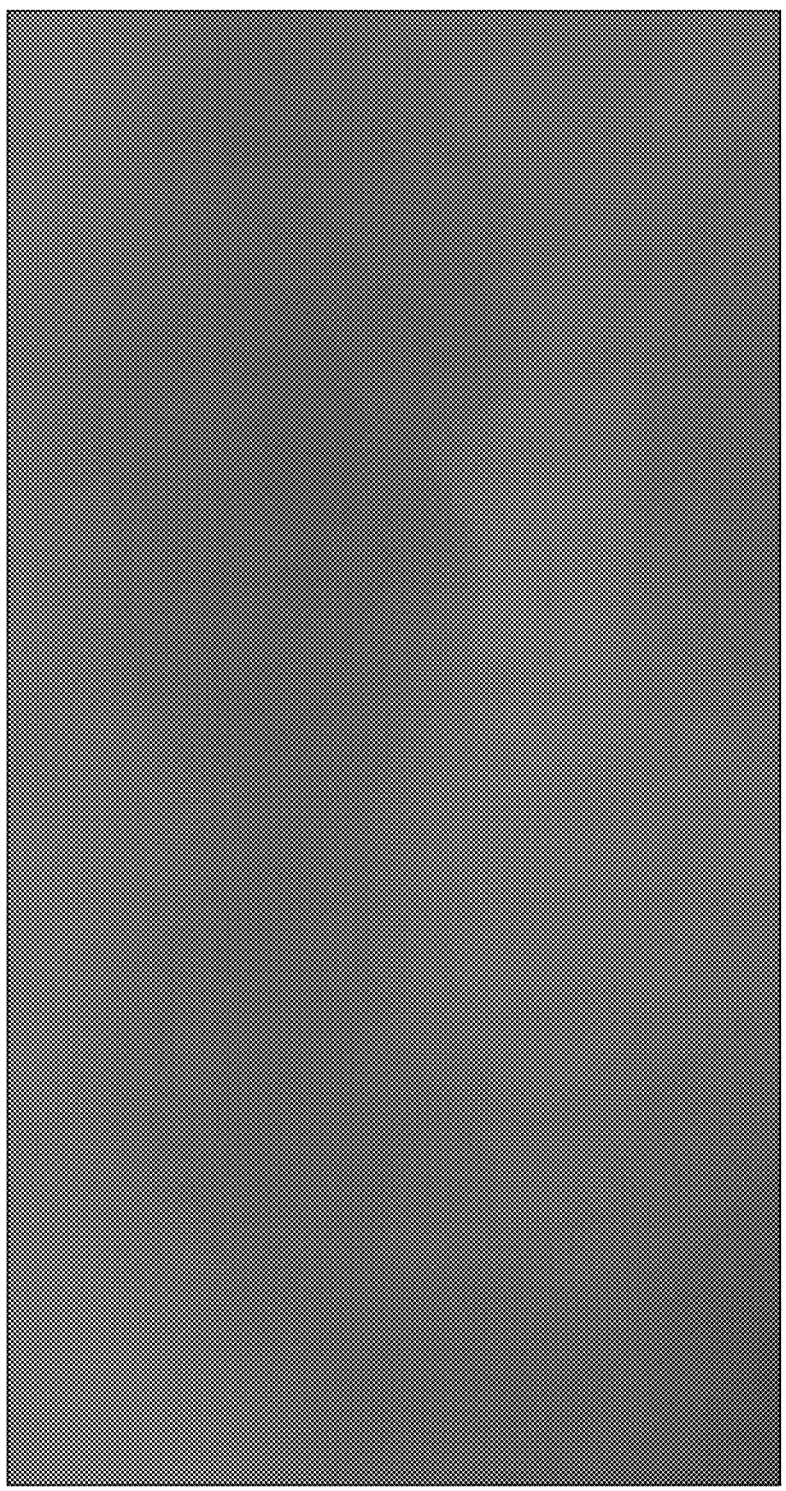
FIG. 10 is a view showing sensed differences in the temperature of the display panel as a chromaticity image according to the first temperature sensing map data according to some embodiments of the present disclosure.

FIG. 9 is a view showing an example of first temperature sensing map data generated in a first temperature sensing mode. FIG. 10 is a view showing sensed differences in the temperature of the display panel as a chromaticity image according to the first temperature sensing map.

Referring to FIGS. 9 and 10, the analog-to-digital converter 430 sequentially converts the output voltages detected through the sensing circuit 420 into temperature data, which is digital data. Then, the sequentially converted temperature data is transmitted to the sensing map data generator 480. Accordingly, the temperature data sequentially input from the analog-to-digital converter 430 is matched with a touch node layout map of the display panel 100, so that the first temperature sensing map data TP_Data1 is generated (step SS6).

The first temperature sensing map data TP_Data1 is transmitted to the display driver circuit 200, and the compensation data generator 260 of the display driver circuit 200 sets compensation values based on a difference in the capacitance of each of the touch nodes TN included in the first temperature sensing map data TP_Data1. The display driver circuit 200 generates compensation data by calculating the compensation values on the image data, thereby compensating for the display quality of the image according to the temperature deviations across the display area DA of the display panel 100.

On the other hand, the timing controller 210 may select a second temperature sensing mode so that the touch driver circuit 400 can generate second temperature sensing map data TP1_Data2 using the data lines DL of the display panel 100 and the sensing electrodes RE of the touch sensing unit TSU (step SS7).

The timing controller 210 generates the second mode sensing control signal MDS2 among the first to third mode sensing control signals MDS1, MDS2 and MDS3 in response to the selected second temperature sensing mode, and transmits the second mode sensing control signal MDS2 to the touch driver circuit 400 (step SS8).

The sensing voltage output 240 of the timing controller 210 generates the second sensing reference voltage DVP_Data while the second mode sensing control signal MDS2 is input, to supply it to the data lines DL of the display panel 100.

The temperature sensing controller 470 of the touch driver circuit 400 controls the detecting operation of the second sensing reference voltages DVP_Data and the sensing voltages RED by the sensing circuit 420 in response to the second mode sensing control signal MDS2. Accordingly, in response to the second mode sensing control signal MDS2, the sensing circuit 420 detects the second sensing reference voltages DVP_Data fed back from the data lines DL of the display panel 100 and the sensing voltages RED detected through the sensing electrodes RE to sense the amount of changes in the mutual capacitance formed at each of the touch nodes TN where the data lines DL and the sensing electrodes RE intersect each other (step SS9).

Figure 11:
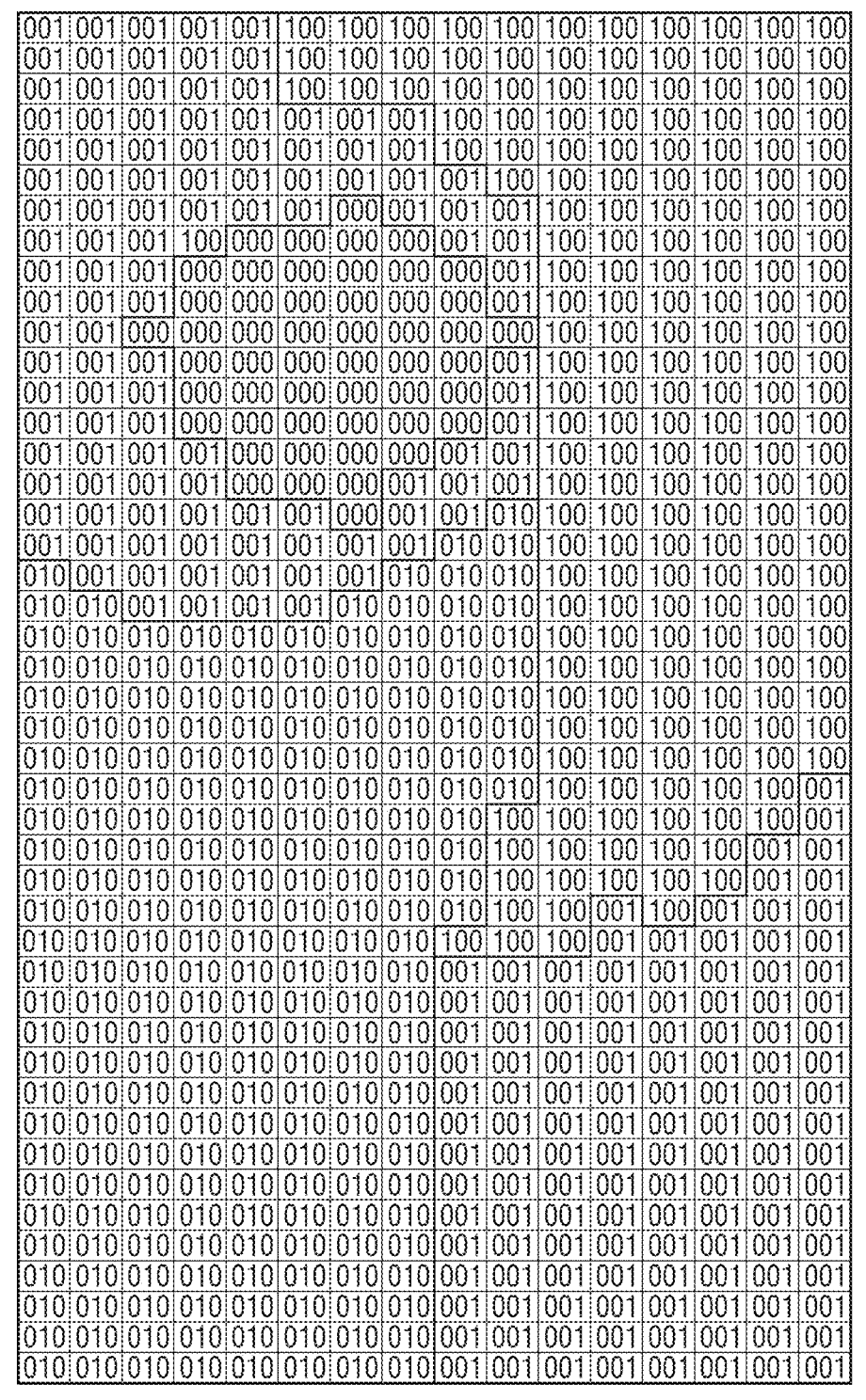
Figure 12:
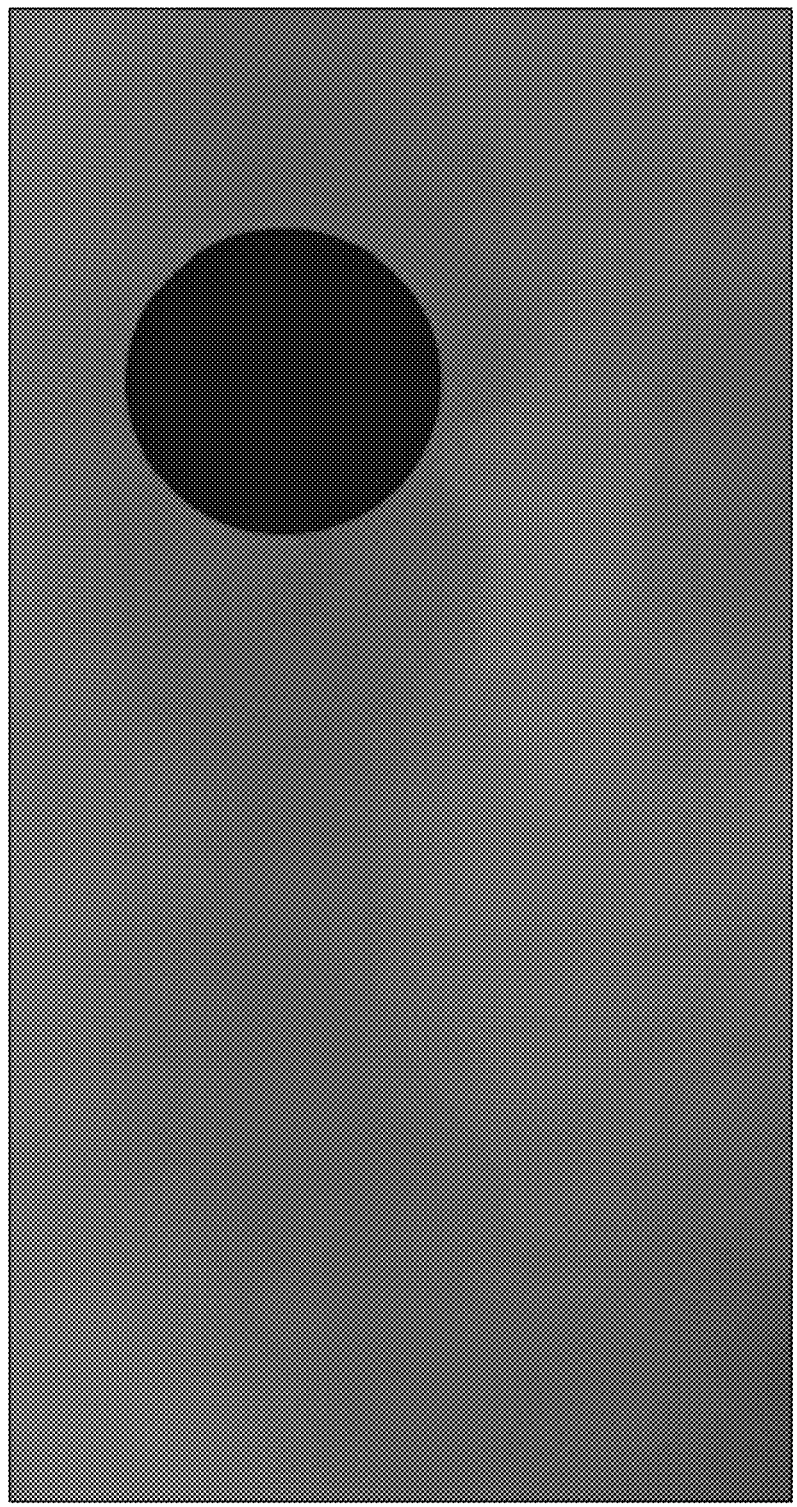
FIG. 12 is a view showing sensed differences in the temperature of the display panel as a chromaticity image according to the second temperature sensing map data according to some embodiments of the present disclosure.

FIG. 11 is a view showing an example of second temperature sensing map data generated in a second temperature sensing mode. FIG. 12 is a view showing sensed differences in the temperature of the display panel as a chromaticity image according to the second temperature sensing map.

Referring to FIGS. 11 and 12, the analog-to-digital converter 430 sequentially converts the second sensing reference voltages DVP_Data and the sensing voltages RED detected through the sensing circuit 420 into temperature data, which is digital data. Then, the sequentially converted temperature data is transmitted to the sensing map data generator 480. Accordingly, the temperature data sequentially input from the analog-to-digital converter 430 is matched with an intersecting node layout map of the display panel 100, so that the second temperature sensing map data TP_Data2 is generated (step SS10).

As shown in FIGS. 11 and 12, the temperature of some regions of the display area DA of the display panel 100 may be lowered due to external factors, and the second temperature sensing map data TP_Data2 may contain temperature data on the regions where the temperature is lowered. The second temperature sensing map data TP_Data1 is transmitted to the display driver circuit 200, and the compensation data generator 260 of the display driver circuit 200 sets compensation values based on a difference in the capacitance of each of the touch nodes TN included in the second temperature sensing map data TP_Data2.

The display driver circuit 200 generates compensation data by calculating the compensation values on the image data, thereby compensating for the display quality of the image according to the temperature deviations across the display area DA of the display panel 100.

Alternatively, the timing controller 210 may select the third temperature sensing mode so that the touch driver circuit 400 generates first and second temperature sensing map data TP1_Data1 and TP1_Data2 alternately at least every frame, and generates the third temperature sensing map data TP1_Data3 according to the accumulated average of the first and second temperature sensing map data TP1_Data1 and TP1_Data2. Accordingly, the timing controller 210 may generate the third mode sensing control signal MDS3 in response to the selected third temperature sensing mode and may transmit the third mode sensing control signal MDS3 to the touch driver circuit 400.

The temperature sensing controller 470 of the touch driver circuit 400 generates the first and second mode sensing control signals MDS1 and MDS2 alternately at least every frame in response to the third mode sensing control signal MDS3. Then, the temperature sensing controller 470 provides the alternately generated first and second mode sensing control signals MDS1 and MDS2 to the driving signal output 410 and the sensing voltage output 240 of the timing controller 210 (step S11).

When the first mode sensing control signal MDS1 is input, the sensing circuit 420 detects the driving voltages FRTD fed back from the driving electrodes TE and the sensing voltages RED detected through the sensing electrodes RE to sense the amount of change in the mutual capacitance of each of the touch nodes TN (step SS5).

When the second mode sensing control signal MDS2 is alternately input, the sensing circuit 420 detects the second sensing reference voltages DVP_Data fed back from the data lines DL of the display panel 100 and the sensing voltages RED detected through the sensing electrodes RE to sense the amount of changes in the mutual capacitance formed at each of the touch nodes TN where the data lines DL and the sensing electrodes RE intersect each other (step SS9).

Figure 13:
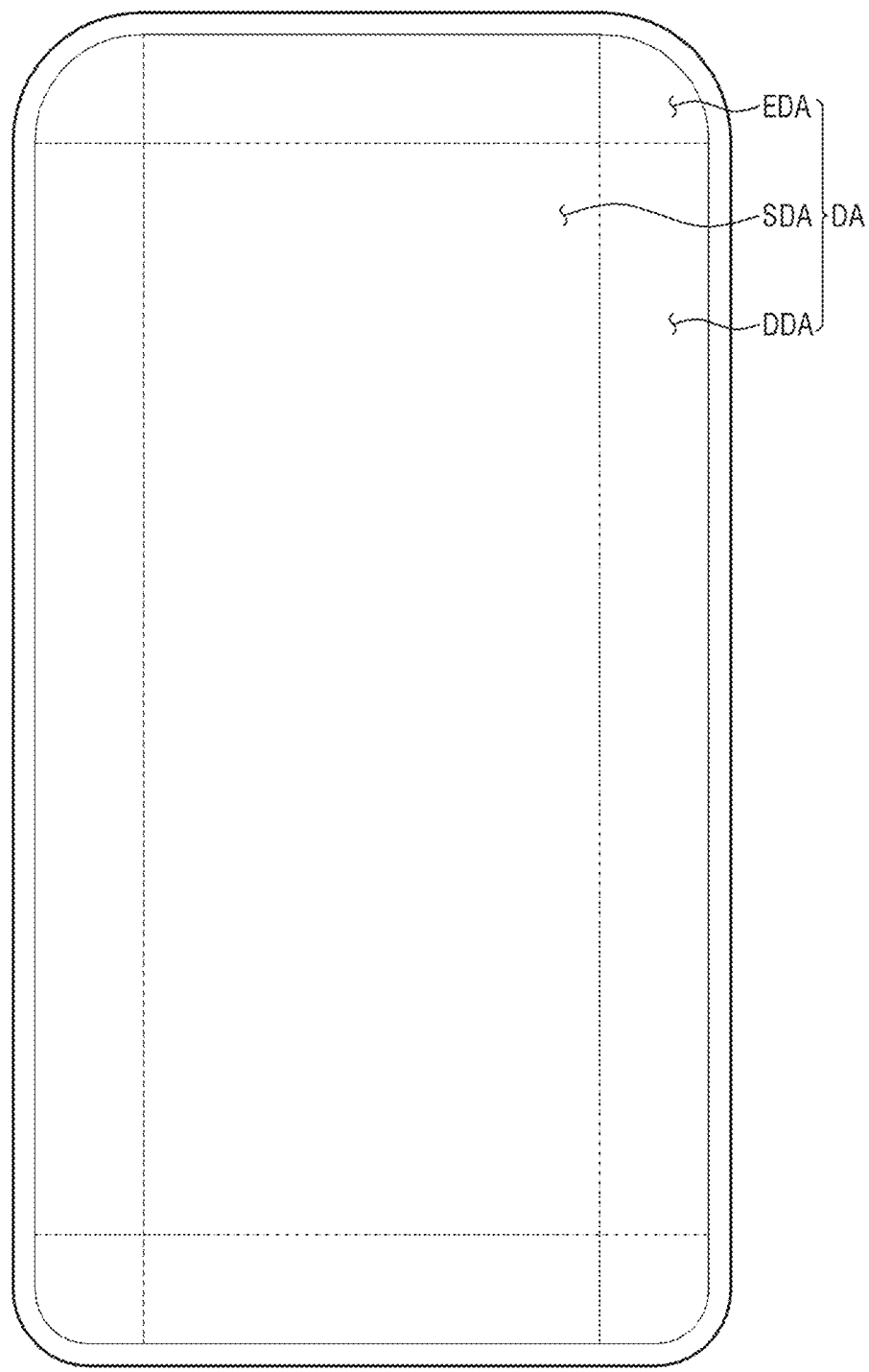
FIG. 13 is a plan view in which an image display surface of a display panel is divided into a central area, an outer area, and an edge area according to some embodiments of the present disclosure.
Figure 14:
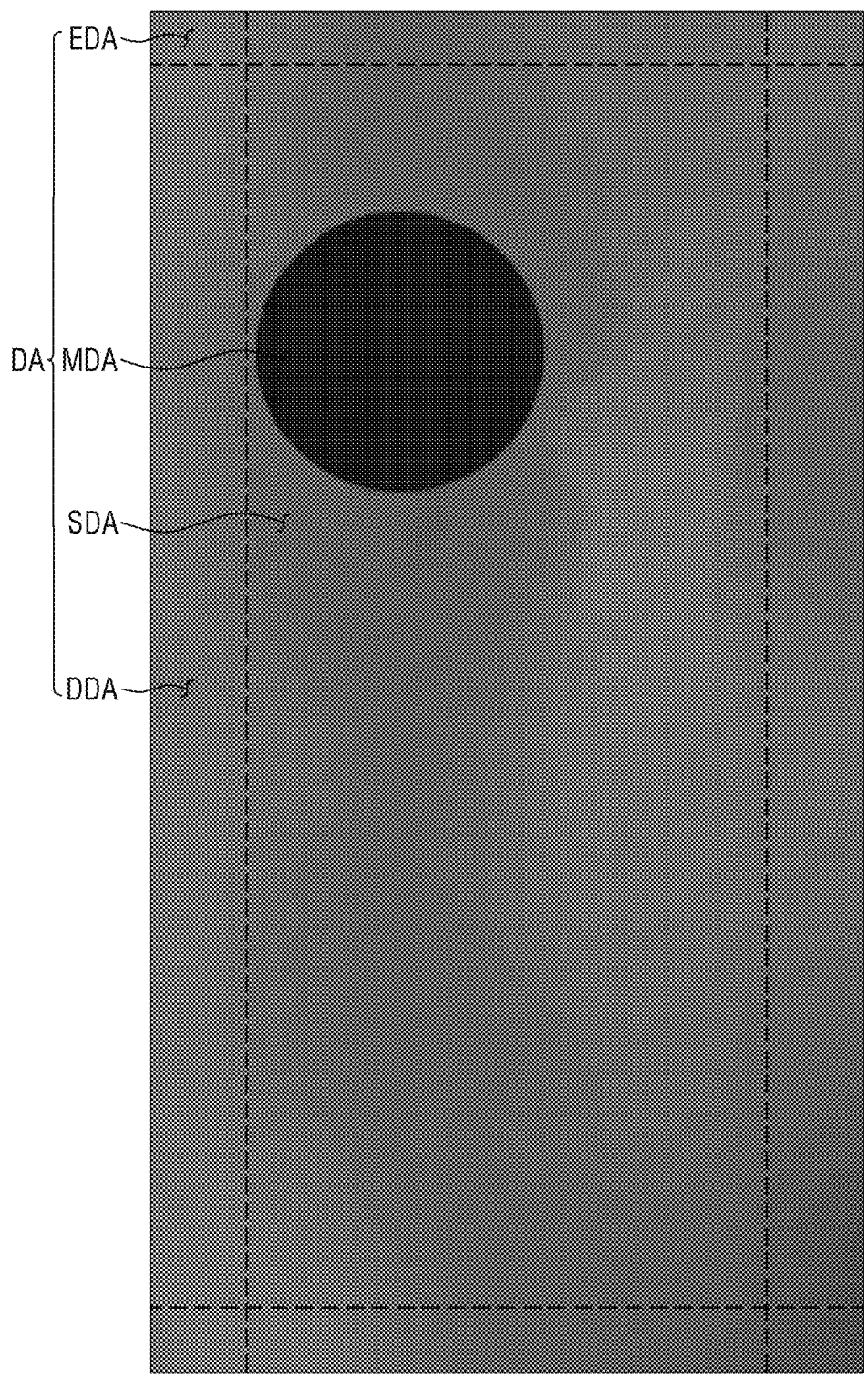
FIG. 14 is a view showing sensed differences in the temperature of the display panel as a chromaticity image according to the third temperature sensing map data according to some embodiments of the present disclosure.

FIG. 13 is a plan view in which an image display surface of a display panel is divided into a central area, an outer area, and an edge area according to some embodiments of the present disclosure. FIG. 14 is a view showing sensed differences in the temperature of the display panel as a chromaticity image according to the third temperature sensing map.

Referring to FIGS. 13 and 14, the analog-to-digital converter 430 sequentially converts the output voltages alternately detected through the sensing circuit 420 into temperature data, which is digital data. Then, the sequentially converted temperature data are transmitted to the sensing map data generator 480.

The sensing map data generator 480 matches the temperature data alternately and sequentially input from the analog-to-digital converter 430 at least every frame with the touch node layout map of the display panel 100 at least every frame. In addition, first and second temperature sensing map data TP_Data1 and TP_Data2 are generated alternately at least every frame.

The sensing map data generator 480 may accumulate the first temperature sensing map data TP_Data1 at least every frame to generate first accumulated temperature sensing data with the average of the accumulated data. In addition, the sensing map data generator 480 may accumulate the second temperature sensing map data TP_Data2 at least every frame to form the second accumulated temperature sensing data with the average of the accumulated data.

Incidentally, the sensing map data generator 480 divides the display area DA of the display panel 100 into a central area SDA, an outer area DDA, and an edge area EDA. Then, the sensing map data generator 480 selectively matches the first or second accumulated temperature sensing data with each of the central area SDA, the outer area DDA and the edge area EDA of the display area DA, to generate accumulated temperature map data of the display panel 100, i.e., third temperature sensing map data TP_Data3.

For example, the second accumulated temperature sensing data is matched with the central area SDA, and the first accumulated temperature sensing data is matched with the outer area DDA and the edge area EDA, so that the third temperature sensing map data TP_Data3 can be created by combining them (step SS12).

The sensing map data generator 480 may apply different weights to the outer area DDA and the edge area EDA of the display area DA at least every frame, and may match the first or second accumulated temperature data according to the different weights.

For example, the second accumulated temperature sensing data is matched with the central area SDA with a higher weight than the outer area DDA and the edge area EDA, and the first accumulated temperature sensing data is matched with the outer area DDA and the edge area EDA with a higher weight than the center area SDA, so that the third temperature sensing map data TP_Data3 may be created by combining them. In doing so, different weights may be applied to the center area, the outer area and the edge area of the display area DA according to the temperature detection accuracy of the first or second accumulated temperature data.

Figure 15:
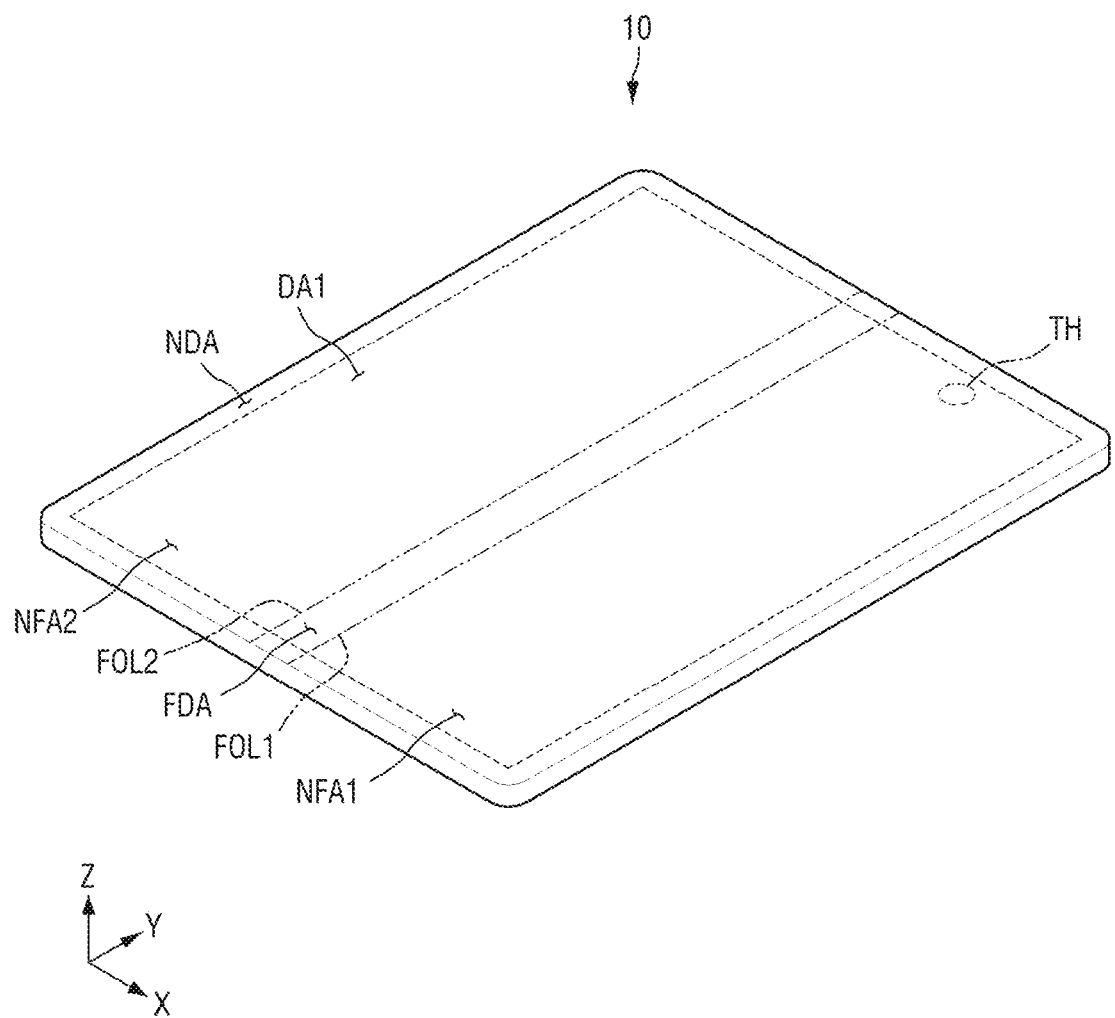
FIGS. 15 and 16 are perspective views showing a display device according to some embodiments of the present disclosure.
Figure 16:
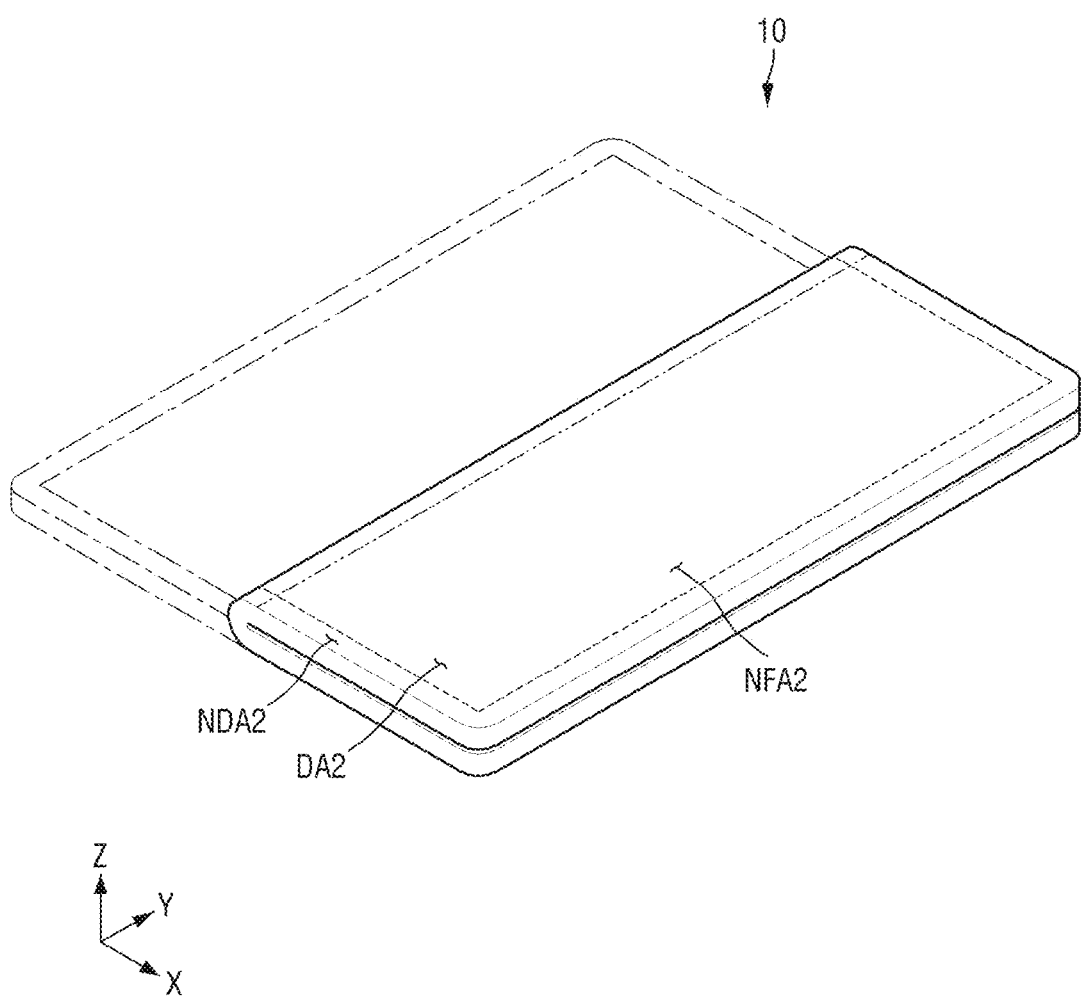

FIGS. 15 and 16 are perspective views showing a display device according to some embodiments of the present disclosure.

In the example shown in FIGS. 15 and 16, a display device 10 is a foldable display device that can be folded in the first direction (x-axis direction). The display device 10 may remain folded as well as unfolded. The display device 10 may be folded inward (in-folding manner) such that the front surface is located inside. When the display device 10 is bent or folded in the in-folding manner, a part of the front surface of the display device 10 may face the other part of the front surface. Alternatively, the display device 10 may be folded outward (out-folding manner) such that the front surface is located outside. When the display device 10 is bent or folded in the out-folding manner, a part of the rear surface of the display device 10 may face the other part of the rear surface.

The first non-folding area NFA1 may be located on one side, for example, the right side of the folding area FDA. The second non-folding area NFA2 may be located on the opposite side, for example, the left side of the folding area FDA. The touch sensing unit TSU according to some embodiments of the present disclosure may be formed and located on each of the first non-folding area NFA1 and the second non-folding area NFA2.

The first folding line FOL1 and the second folding line FOL2 may be extended in the second direction (y-axis direction), and the display device 10 may be folded in the first direction (x-axis direction). As a result, the length of the display device 10 in the first direction (the x-axis direction) may be reduced to about half, so that a user can carry the display device 10 easily.

The direction in which the first folding line FOL1 and the second folding line FOL2 are extended is not limited to the second direction (y-axis direction). For example, the first folding line FOL1 and the second folding line FOL2 may be extended in the first direction (x-axis direction), and the display device 10 may be folded in the second direction (y-axis direction). In such case, the length of the display device 10 in the second direction (y-axis direction) may be reduced to about half. Alternatively, the first folding line FOL1 and the second folding line FOL2 may be extended in a diagonal direction of the display device 10 between the first direction (x-axis direction) and the second direction (y-axis direction). In such case, the display device 10 may be folded in a triangle shape.

When the first folding line FOL1 and the second folding line FOL2 are extended in the second direction (y-axis direction), the length of the folding area FDA in the first direction (x-axis direction) may be smaller than the length in the second direction (y-axis direction). In addition, the length of the first non-folding area NFA1 in the first direction (x-axis direction) may be larger than the length of the folding area FDA in the first direction (x-axis direction). The length of the second non-folding area NFA2 in the first direction (x-axis direction) may be larger than the length of the folding area FDA in the first direction (x-axis direction).

The first display area DA1 may be located on the front side of the display device 10. The first display area DA1 may overlap the folding area FDA, the first non-folding area NFA1, and the second non-folding area NFA2. Therefore, when the display device 10 is unfolded, images may be displayed on the front side of the folding area FDA, the first non-folding area NFA1 and the second non-folding area NFA2 of the display device 10.

The second display area DA2 may be located on the rear side of the display device 10. The second display area DA2 may overlap the second non-folding area NFA2. Therefore, when the display device 10 is folded, images may be displayed on the front side of the second non-folding area NFA2 of the display device 10.

Although the through hole TH where a camera or the like is formed is located in the first non-folding area NFA1 in FIGS. 15 and 16, the present disclosure is not limited thereto. The through hole TH or the camera may be located in the second non-folding area NFA2 or the folding area FDA.

Figure 17:
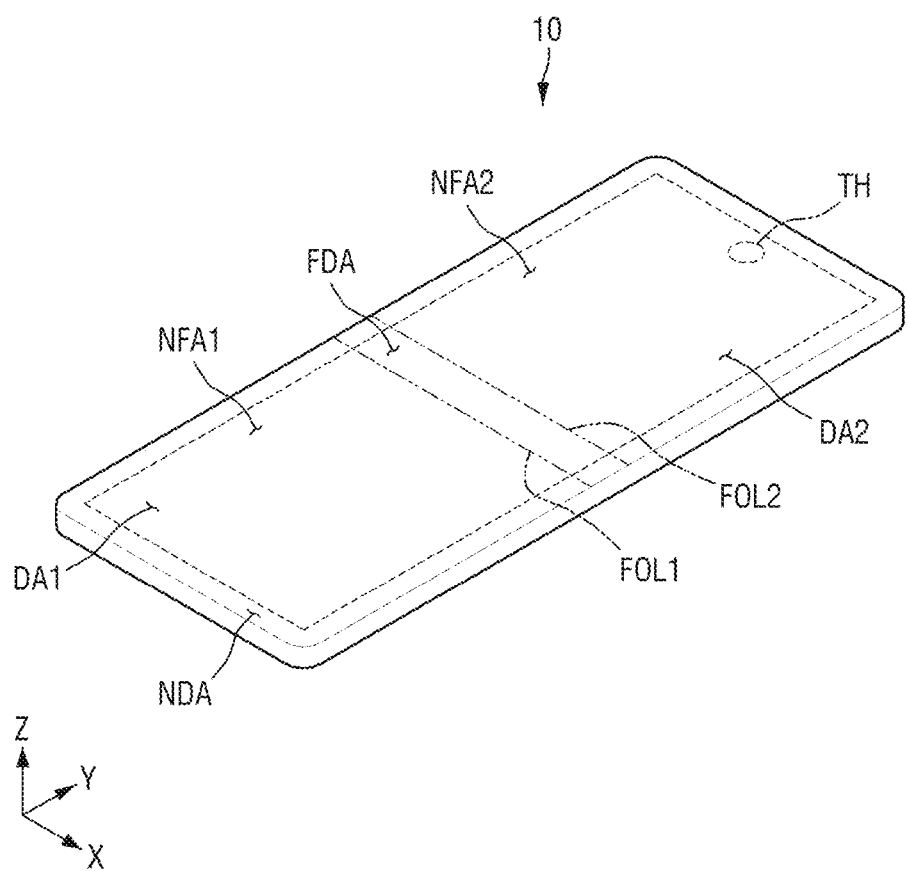
FIGS. 17 and 18 are perspective views showing a display device according to some embodiments of the present disclosure.
Figure 18:
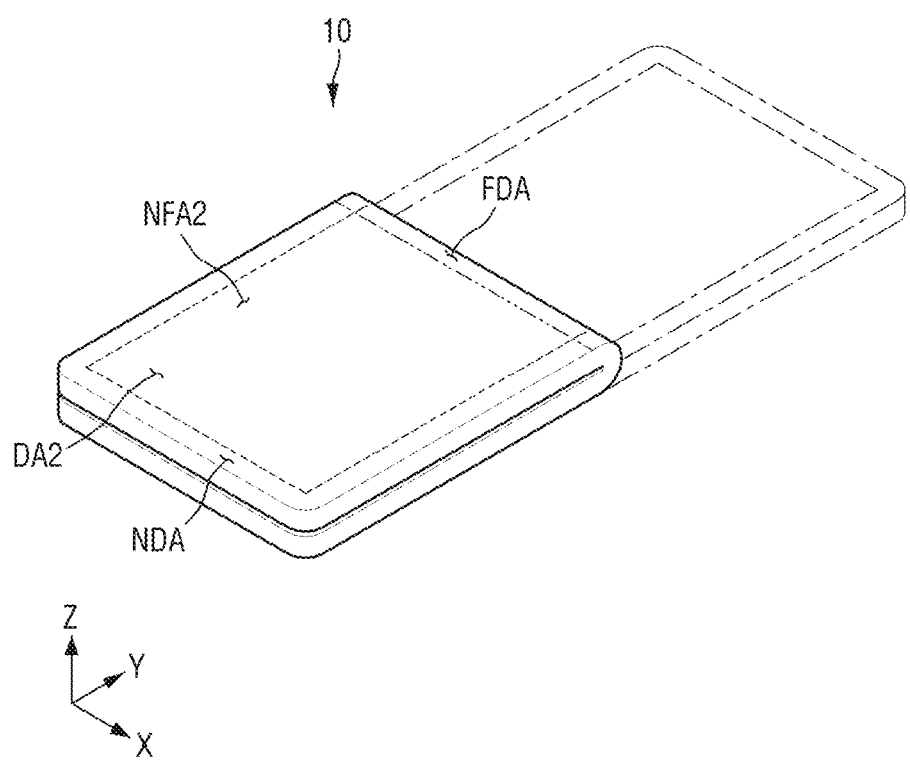

FIGS. 17 and 18 are perspective views showing a display device according to some embodiments of the present disclosure.

In the example shown in FIGS. 17 and 18, a display device 10 is a foldable display device that is folded in the second direction (y-axis direction). The display device 10 may remain folded as well as unfolded. The display device 10 may be folded inward (in-folding manner) such that the front surface is located inside. When the display device 10 is bent or folded in the in-folding manner, a part of the front surface of the display device 10 may face the other part of the front surface. Alternatively, the display device 10 may be folded outward (out-folding manner) such that the front surface is located outside. When the display device 10 is bent or folded in the out-folding manner, a part of the rear surface of the display device 10 may face the other part of the rear surface.

The display device 10 may include a folding area FDA, a first non-folding area NFA1, and a second non-folding area NFA2. The display device 10 can be folded at the folding area FDA, while it cannot be folded at the first non-folding area NFA1 and the second non-folding area NFA2. The first non-folding area NFA1 may be located on one side, for example, the lower side of the folding area FDA. The second non-folding area NFA2 may be located on the other side, for example, the upper side of the folding area FDA.

The touch sensing unit TSU according to some embodiments of the present disclosure may be formed and located on each of the first non-folding area NFA1 and the second non-folding area NFA2.

The folding area FDA may be an area bent with a curvature (e.g., a set or predetermined curvature) over the first folding line FOL1 and the second folding line FOL2. Therefore, the first folding line FOL1 may be a boundary between the folding area FDA and the first non-folding area NFA1, and the second folding line FOL2 may be a boundary between the folding area FDA and the second non-folding area NFA2.

The first folding line FOL1 and the second folding line FOL2 may be extended in the first direction (x-axis direction) as shown in FIGS. 17 and 18, and the display device 10 may be folded in the second direction (y-axis direction). As a result, the length of the display device 10 in the second direction (the y-axis direction) may be reduced to about half, so that the display device 10 is easy to carry.

The direction in which the first folding line FOL1 and the second folding line FOL2 are extended is not limited to the first direction (x-axis direction). For example, the first folding line FOL1 and the second folding line FOL2 may be extended in the second direction (y-axis direction), and the display device 10 may be folded in the first direction (x-axis direction). In such case, the length of the display device 10 in the first direction (x-axis direction) may be reduced to about half. Alternatively, the first folding line FOL1 and the second folding line FOL2 may be extended in a diagonal direction of the display device 10 between the first direction (x-axis direction) and the second direction (y-axis direction). In such case, the display device 10 may be folded in a triangle shape.

When the first folding line FOL1 and the second folding line FOL2 are extended in the first direction (x-axis direction) as shown in FIGS. 17 and 18, the length of the folding area FDA in the second direction (y-axis direction) may be smaller than the length in the first direction (x-axis direction). In addition, the length of the first non-folding area NFA1 in the second direction (y-axis direction) may be larger than the length of the folding area FDA in the second direction (y-axis direction). The length of the second non-folding area NFA2 in the second direction (y-axis direction) may be larger than the length of the folding area FDA in the second direction (y-axis direction).

The first display area DA1 may be located on the front side of the display device 10. The first display area DA1 may overlap the folding area FDA, the first non-folding area NFA1, and the second non-folding area NFA2. Therefore, when the display device 10 is unfolded, images may be displayed on the front side of the folding area FDA, the first non-folding area NFA1 and the second non-folding area NFA2 of the display device 10.

The second display area DA2 may be located on the rear side of the display device 10. The second display area DA2 may overlap the second non-folding area NFA2. Therefore, when the display device 10 is folded, images may be displayed on the front side of the second non-folding area NFA2 of the display device 10.

Although the through hole TH where a camera or the like is located is located in the second non-folding area NFA2 in FIGS. 17 and 18, the present disclosure is not limited thereto. The through hole TH may be located in the first non-folding area NFA1 or the folding area FDA.

In concluding the detailed description, those skilled in the art will appreciate that many variations and modifications can be made to the embodiments according to the present disclosure without substantially departing from the principles of embodiments according to the present disclosure. Therefore, the embodiments according to the present disclosure are used in a generic and descriptive sense only and not for purposes of limitation.

What is claimed is:

1. A display device comprising:
a touch sensing unit on a front surface of an image display area and configured to sense a location of a touch;
a display driver circuit configured to select one of first to third temperature sensing modes during a predetermined temperature sensing period and to generate at least one of first to third mode sensing control signals according to the selected temperature sensing mode; and
a touch driver circuit configured to generate at least one of first to third temperature sensing map data in response to at least one of the first to third mode sensing control signals, wherein the display driver circuit is configured to compensate for image data based on at least one of the first to third temperature sensing map data and to display an image according to the compensated image data in the image display area, wherein the first temperature sensing map data is based on signals corresponding to driving electrodes and sensing electrodes arranged in the touch sensing unit, wherein the second temperature sensing map data is based on signals corresponding to gate or data lines of the image display area and driving electrodes or sensing electrodes arranged in the touch sensing unit, and wherein the third temperature sensing map data is generated according to an average of accumulated values of the first and second temperature sensing map data.

2. The display device of claim 1, wherein the display driver circuit is configured to select the first temperature sensing mode so that the touch driver circuit generates the first temperature sensing map data using driving electrodes and sensing electrodes arranged perpendicular to one another other in the touch sensing unit, and to generate the first mode sensing control signal according to the selected first temperature sensing mode to transmit the generated first mode sensing control signal to the touch driver circuit.

3. The display device of claim 2, wherein the touch driver circuit is configured to provide a first sensing reference voltage having a predetermined voltage magnitude to the driving electrodes in response to the first mode sensing control signal, and to detect driving voltages fed back from the driving electrodes and sensing voltages detected through the sensing electrodes to sense a change in mutual capacitance of each of touch nodes where the driving electrodes and the sensing electrodes intersect each other.

4. The display device of claim 3, wherein the touch driver circuit is configured to sequentially convert the driving voltages fed back from the driving electrodes and the sensing voltages detected through the sensing electrodes into digital temperature data, and to generate the first temperature sensing map data by matching the sequentially converted digital temperature data with a touch node layout map of the image display area.

5. The display device of claim 1, wherein the display driver circuit is configured to select the second temperature sensing mode so that the touch driver circuit generates the second temperature sensing map data using gate or data lines of the image display area and driving electrodes or sensing electrodes arranged in the touch sensing unit, to generate the second mode sensing control signal according to the selected second temperature sensing mode to transmit it to the touch driver circuit.

6. The display device of claim 5, wherein the touch driver circuit is configured to provide a first sensing reference voltage having a predetermined voltage magnitude to the driving electrodes in response to the first mode sensing control signal, wherein the display driver circuit is configured to provide a second sensing reference voltage having a predetermined magnitude to the gate or data lines in response to the second mode sensing control signal, and wherein the touch driver circuit is configured to detect the first and second sensing reference voltages fed back from the gate or data lines and the sensing voltages detected through the driving electrodes or the sensing electrodes to sense an amount of charge in a mutual capacitance of nodes where the gate or data lines and the driving electrodes or the sensing electrodes intersect each other.

7. The display device of claim 6, wherein the touch driver circuit is configured to sequentially convert the sensing reference voltages fed back from the gate or data lines and the sensing voltages detected through the driving electrodes or the sensing electrodes into digital temperature data, and to generate the second temperature sensing map data by matching the sequentially converted digital temperature data with an intersecting node layout map of the image display area.

8. The display device of claim 1, wherein the display driver circuit is configured to select the third temperature sensing mode so that the touch driver circuit alternately generates the first and second temperature sensing map data at least every frame and generates the third temperature sensing map data according to an average of accumulated values of the first and second temperature sensing map data, and to generate the third mode sensing control signal according to the selected third temperature sensing mode to transmit it to the touch driver circuit.

9. The display device of claim 8, wherein the touch driver circuit is configured to alternately generate the first and second mode sensing control signals at least every frame in response to the third mode sensing control signal, wherein the touch driver circuit is configured to generate the first mode sensing control signal by providing a first sensing reference voltage having a predetermined magnitude to driving electrodes of the touch sensing unit, and to detect driving voltages fed back from the driving electrodes and sensing voltages detected through the sensing electrodes of the touch sensing unit to sense an amount of change in a mutual capacitance of each of a plurality of touch nodes where the driving electrodes and the sensing electrodes intersect each other, and wherein the touch driver circuit is configured to generate the second mode sensing control signal by providing a second sensing reference voltage having a predetermined magnitude to gate or data lines of the image display area, and to detect the sensing reference voltages fed back from the gate or data lines and the sensing voltages detected through the driving electrodes or the sensing electrodes to sense an amount of change in the mutual capacitance of each of node where the gate or data lines and the driving electrodes or the sensing electrodes intersect each other.

10. The display device of claim 9, wherein the touch driver circuit is configured to sequentially convert the driving voltages or the sensing reference voltages alternately fed back at least every frame and the sensing voltages detected through the driving electrodes or the sensing electrodes into digital temperature data, and to alternately generate the first and second temperature sensing map data at least every frame by sequentially matching the sequentially converted digital temperature data with touch nodes or an intersecting node layout map of the image display area.

11. The display device of claim 10, wherein the touch driver circuit is configured to accumulate the first temperature sensing map data at least every frame to create first accumulated temperature sensing data with an average of the accumulated data, and to accumulate the second temperature sensing map data at least every frame to create second accumulated temperature sensing data with an average of the accumulated data, and wherein the image display area is divided into a central area, an outer area, and an edge area, and the first or second accumulated temperature sensing data is selectively matched with each of the central area, the outer area, and the edge area to create the third temperature sensing map data that is accumulated temperature map data.

12. A display device comprising:
a touch sensing unit on a front surface of an image display area and configured to sense a location of a touch;
a display driver circuit configured to select a temperature sensing mode in a predetermined temperature sensing period and to generate first through third sensing control signals according to the selected temperature sensing mode; and
a touch driver circuit configured to generate at least one temperature sensing map data in response to the mode sensing control signal,
wherein the display driver circuit is configured to compensate for image data based on the at least one temperature sensing map data and to display an image according to the compensated image data in the image display area,
wherein a first temperature sensing map data is based on signals corresponding to driving electrodes and sensing electrodes arranged in the touch sensing unit,
wherein a second temperature sensing map data is based on signals corresponding to gate or data lines of the image display area and driving electrodes or sensing electrodes arranged in the touch sensing unit, and
wherein a third temperature sensing map data is generated according to an average of accumulated values of the first and second temperature sensing map data.

13. The display device of claim 12, wherein the display driver circuit is configured to generate a first mode sensing control signal so that the touch driver circuit generates the first temperature sensing map data using driving electrodes and sensing electrodes arranged in the touch sensing unit such that they are perpendicular to each other, and
wherein the touch driver circuit is configured to provide a first sensing reference voltage having a predetermined magnitude to the driving electrodes and to detect driving voltages fed back from the driving electrodes and sensing voltages detected through the sensing electrodes, and wherein the touch driver circuit is configured to sequentially convert the driving voltages fed back from the driving electrodes and the sensing voltages detected through the sensing electrodes into digital temperature data, and wherein the touch driver circuit is configured to match the sequentially converted digital temperature data with a touch node layout map of the image display area to generate the first temperature sensing map data.

14. The display device of claim 12, wherein the display driver circuit is configured to generate a second mode sensing control signal so that the touch driver circuit generates the second temperature sensing map data using gate or data lines of the image display area and driving electrodes or sensing electrodes arranged in the touch sensing unit, and to provide a second sensing reference voltage having a predetermined voltage magnitude to the gate or data lines of the image display area.

15. The display device of claim 14, wherein the touch driver circuit is configured to detect the sensing reference voltages fed back from the gate or data lines and the sensing voltages detected through the driving electrodes or the sensing electrodes, to sequentially convert the sensing reference voltages fed back from the gate or data lines and the sensing voltages detected through the driving electrodes or the sensing electrodes into digital temperature data, and to generate the second temperature sensing map data by matching the sequentially converted digital temperature data with an intersecting node layout map of the image display area.

16. The display device of claim 12, wherein the display driver circuit is configured to select a third temperature sensing mode and to generate a third mode sensing control signal to transmit it to the touch driver circuit so that the touch driver circuit alternately generates the first and second temperature sensing map data at least every frame and generates the third temperature sensing map data according to an average of accumulated values of the first and second temperature sensing map data, and to generate the third mode sensing control signal according to the selected third temperature sensing mode to transmit it to the touch driver circuit.

17. The display device of claim 16, wherein the touch driver circuit is configured to alternately generate first and second mode sensing control signals at least every frame in response to the third mode sensing control signal,
wherein the touch driver circuit is configured to generate the first mode sensing control signal by providing a first sensing reference voltage having a predetermined magnitude to driving electrodes, and to detect driving voltages fed back from the driving electrodes and sensing voltages detected through the sensing electrodes to sense an amount of change in a mutual capacitance of each of a plurality of touch nodes where the driving electrodes and the sensing electrodes intersect each other, and
wherein the touch driver circuit is configured to generate the second mode sensing control signal by providing a second sensing reference voltage having a predetermined magnitude to gate or data lines of the image display area, and to detect the sensing reference voltages fed back from the gate or data lines and the sensing voltages detected through the driving electrodes or the sensing electrodes to sense an amount of change in the mutual capacitance of each of node where the gate or data lines and the driving electrodes or the sensing electrodes intersect each other.

18. The display device of claim 17, wherein the touch driver circuit is configured to sequentially convert the driving voltages or the sensing reference voltages alternately fed back at least every frame and the sensing voltages detected through the driving electrodes or the sensing electrodes into digital temperature data, and to alternately generate the first and second temperature sensing map data at least every frame by sequentially matching the sequentially converted digital temperature data with touch nodes or an intersecting node layout map of the image display area.

19. The display device of claim 18, wherein the touch driver circuit is configured to accumulate the first temperature sensing map data at least every frame to create first accumulated temperature sensing data with an average of the accumulated data, and to accumulate the second temperature sensing map data at least every frame to create second accumulated temperature sensing data with an average of the accumulated data, and
wherein the image display area is divided into a central area, an outer area, and an edge area, and the first or second accumulated temperature sensing data is selectively matched with each of the central area, the outer area and the edge area to create the third temperature sensing map data that is accumulated temperature map data.

20. An electronic device including a display device, wherein the display device comprises:

a touch sensing unit on a front surface of an image display area and configured to sense a location of a touch;

a display driver circuit configured to select one of first to third temperature sensing modes during a predetermined temperature sensing period and to generate at least one of first to third mode sensing control signals according to the selected temperature sensing mode; and a touch driver circuit configured to generate at least one of first to third temperature sensing map data in response to at least one of the first to third mode sensing control signals, wherein the display driver circuit is configured to compensate for image data based on at least one of the first to third temperature sensing map data and to display an image according to the compensated image data in the image display area, wherein the first temperature sensing map data is based on signals corresponding to driving electrodes and sensing electrodes arranged in the touch sensing unit, wherein the second temperature sensing map data is based on signals corresponding to gate or data lines of the image display area and driving electrodes or sensing electrodes arranged in the touch sensing unit, and wherein the third temperature sensing map data is generated according to an average of accumulated values of the first and second temperature sensing map data.

\* \* \* \* \*